United States Patent [19]

Bezerra et al.

[11] Patent Number: 5,716,069
[45] Date of Patent: Feb. 10, 1998

[54] MOTION TRANSFER MECHANISM FOR TRANSFERRING RECIPROCOL MOTION TO ROTARY MOTION

[76] Inventors: Wilson X. Bezerra; Silvana A. Bezerra, both of 9 Elena Pl., Belleville, N.J. 07109

[21] Appl. No.: 419,358

[22] Filed: Apr. 10, 1995

Related U.S. Application Data

[63] Continuation-in-part of Ser. No. 116,391, Sep. 3, 1993, Pat. No. 5,405,157, which is a continuation of Ser. No. 804,768, Dec. 9, 1991, Pat. No. 5,242,182.

[51] Int. Cl.⁶ ............................................. B62M 1/04
[52] U.S. Cl. ................................. 280/254; 280/253
[58] Field of Search ............................ 280/253, 257, 280/254, 255, 258, 245, 246

[56] References Cited

U.S. PATENT DOCUMENTS

| | | | |
|---|---|---|---|
| 4,169,609 | 10/1979 | Zampedro | 280/241 |
| 4,445,701 | 5/1984 | Stroud | 280/217 |
| 4,456,276 | 6/1984 | Bortolin | 280/257 |
| 5,121,654 | 6/1992 | Fasce | 280/255 |
| 5,172,926 | 12/1992 | Mannino | 280/252 |
| 5,242,182 | 9/1993 | Bezerra et al. | 280/253 |

FOREIGN PATENT DOCUMENTS

| | | | |
|---|---|---|---|
| 0519543 | 6/1921 | France | 280/254 |
| 306368 | 3/1933 | Italy | 280/253 |
| 13980 | 6/1897 | United Kingdom | 280/253 |

*Primary Examiner*—Anne Marie Boehler
*Attorney, Agent, or Firm*—Adams & Wilks

[57] ABSTRACT

A motion transfer mechanism for transferring reciprocal motion to rotary motion comprises at least one driving member having front and rear end portions terminating, respectively, in front and rear ends and mounted to undergo reciprocal motion about a first axis located closer to the rear end than the front end of the driving member. At least one rotary member is mounted to undergo angular displacement about a second axis. An interconnecting member connects the driving member to the rotary member, such that reciprocal motion of the driving member effects angular displacement of the rotary member about the second axis. At least one driven member is mounted to undergo rotary motion in one direction of rotation about the second axis. A transfer device drivingly connects the rotary member to the driven member for transferring angular displacement of the rotary member to rotary motion of the driven member in the one direction of rotation. In this manner, the reciprocal motion of the driving member about the first axis is effectively transferred to rotary motion of the driven member in the one direction of rotation without requiring the application of a substantial force.

49 Claims, 12 Drawing Sheets

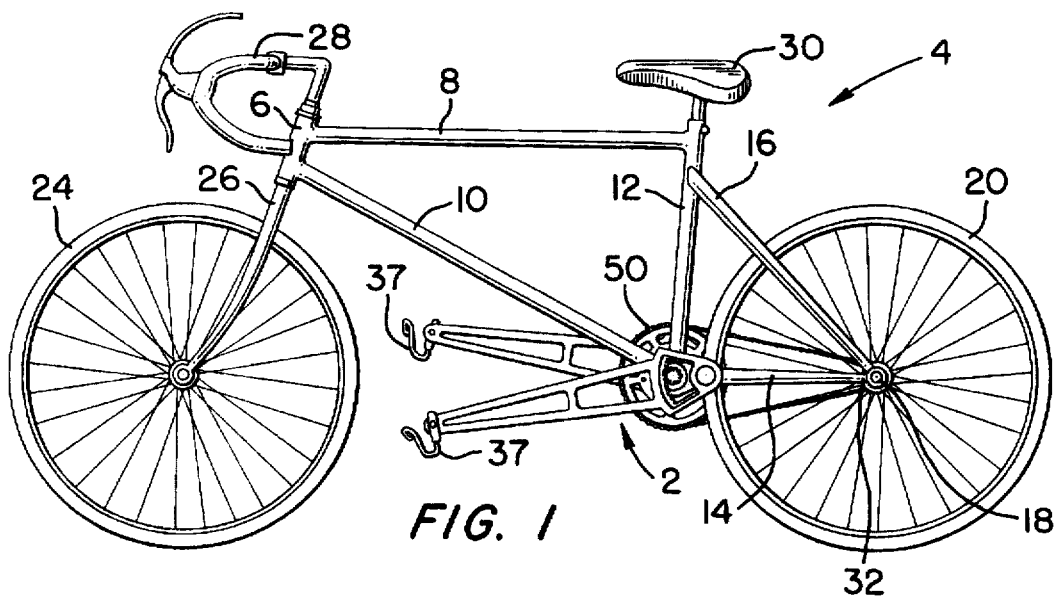
FIG. 1
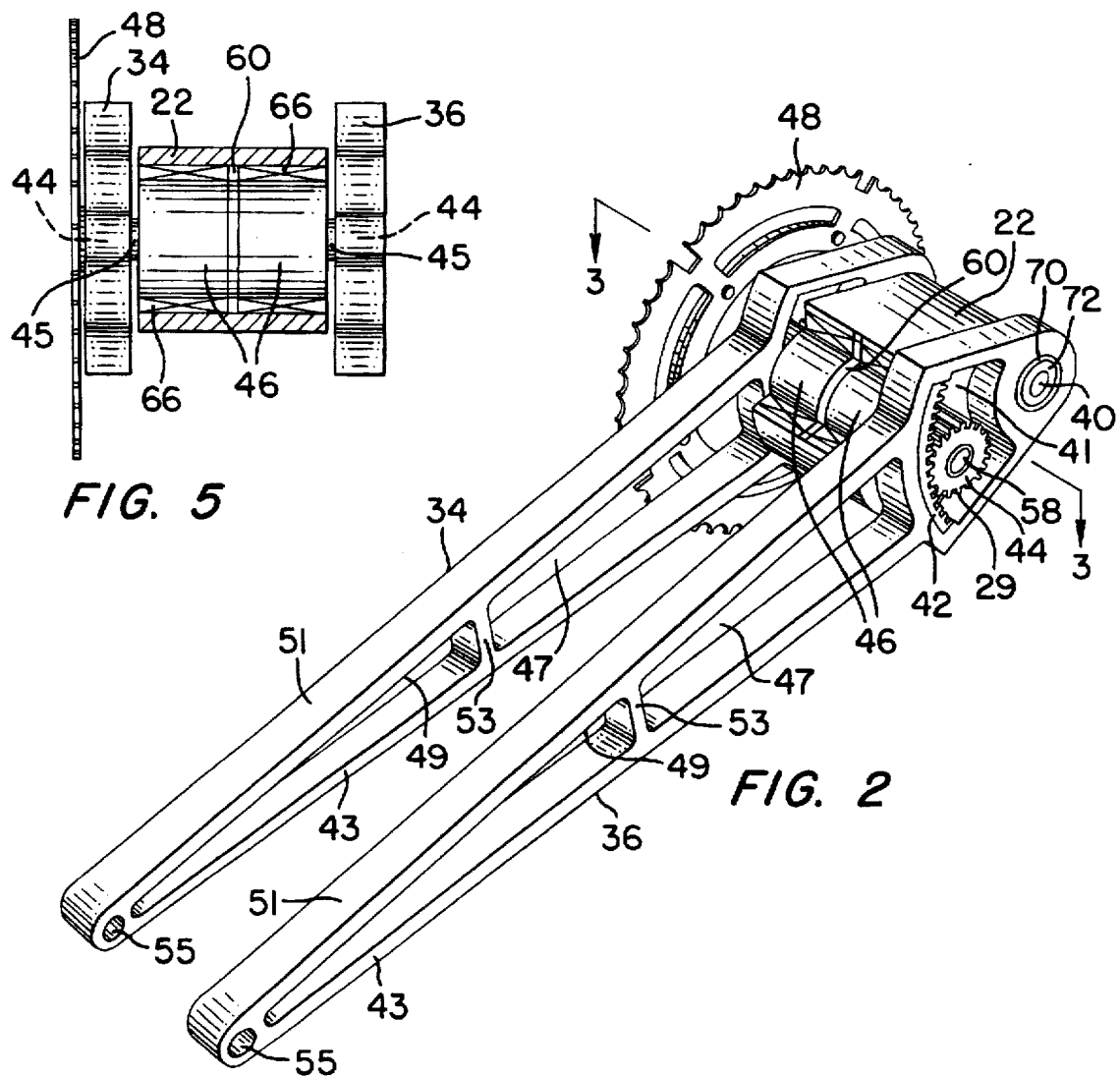
FIG. 5
FIG. 2

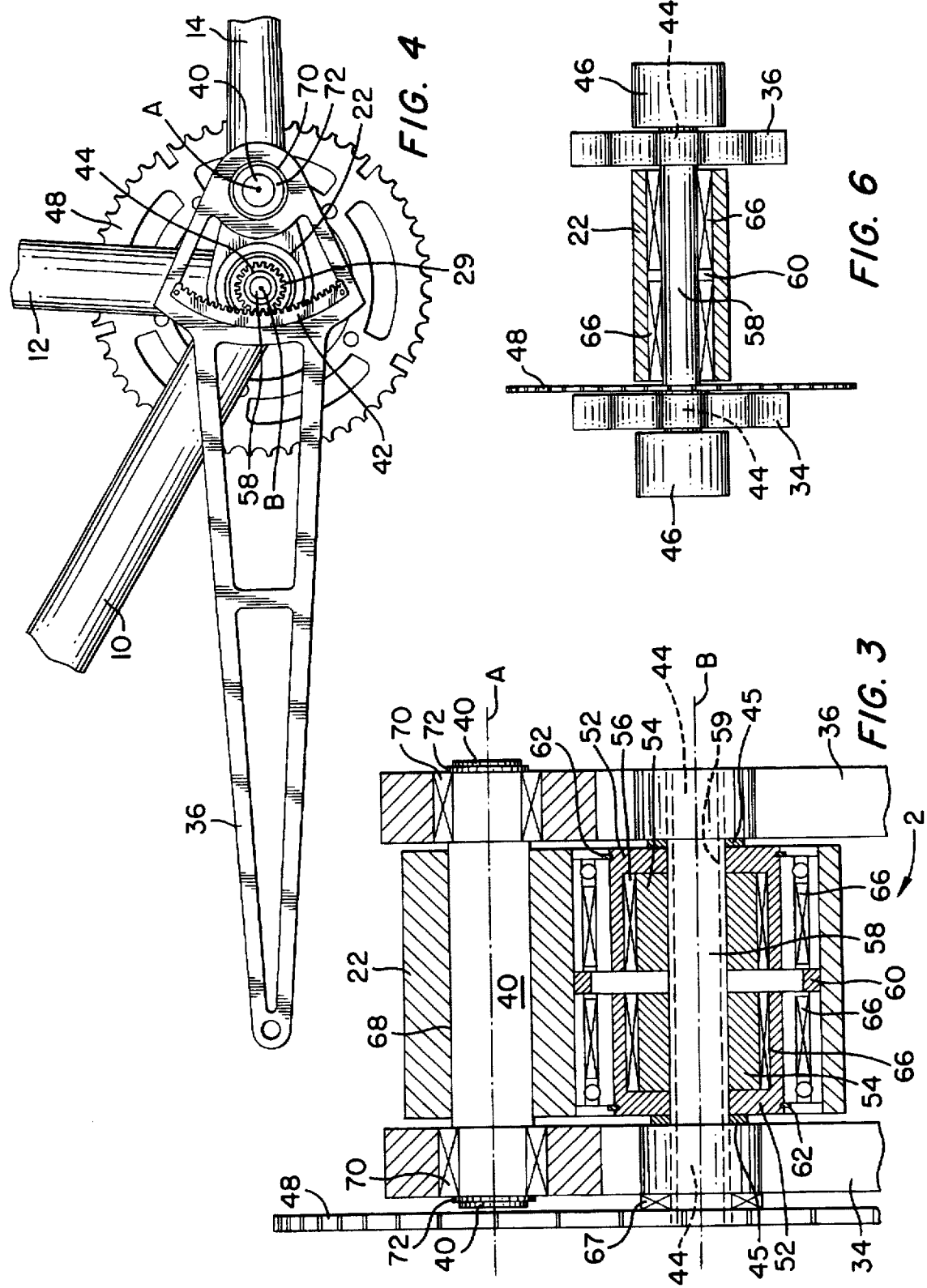

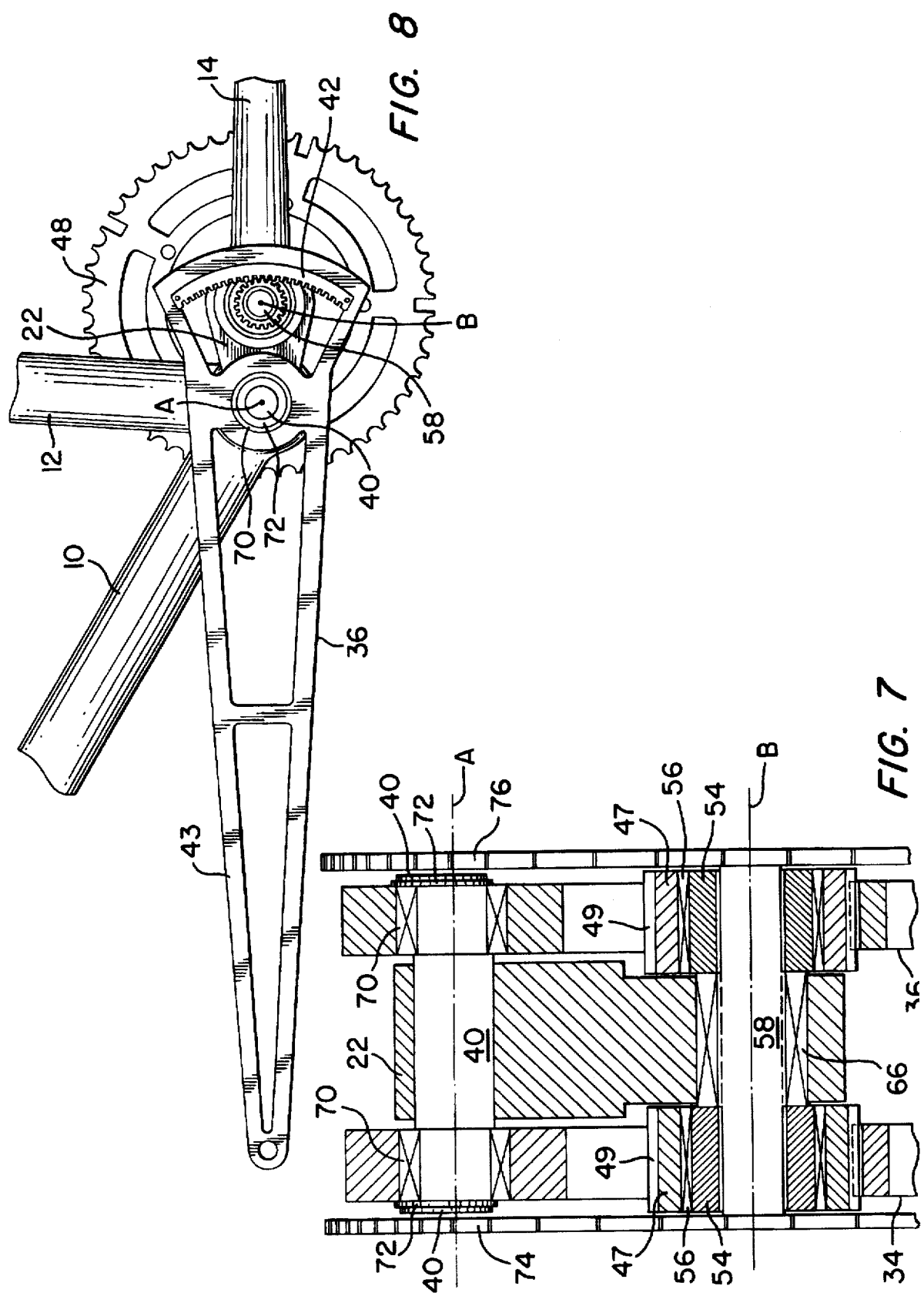

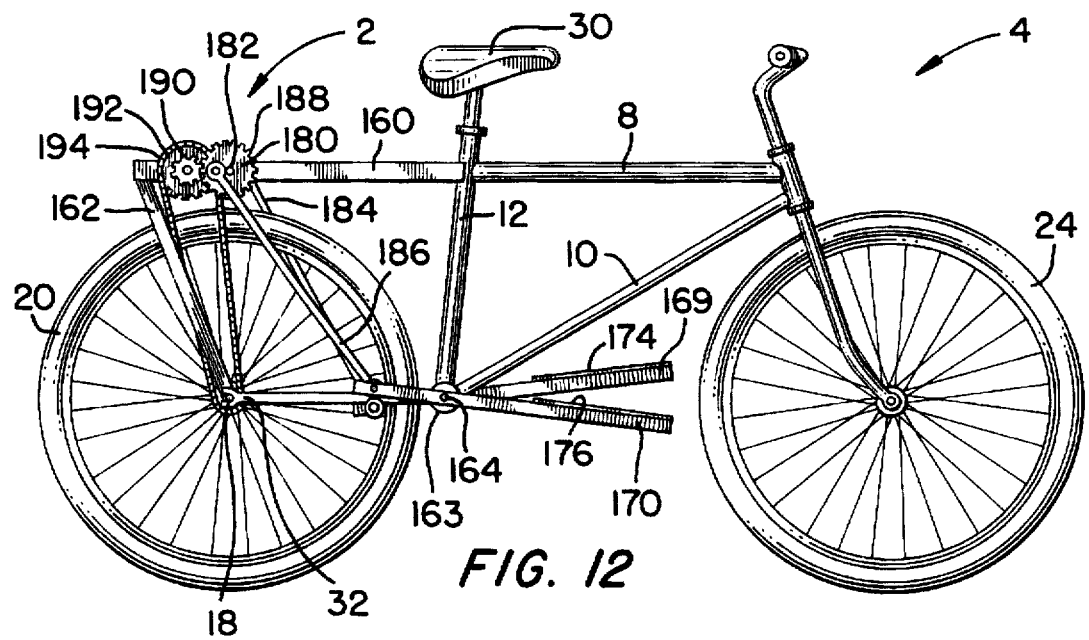
FIG. 12
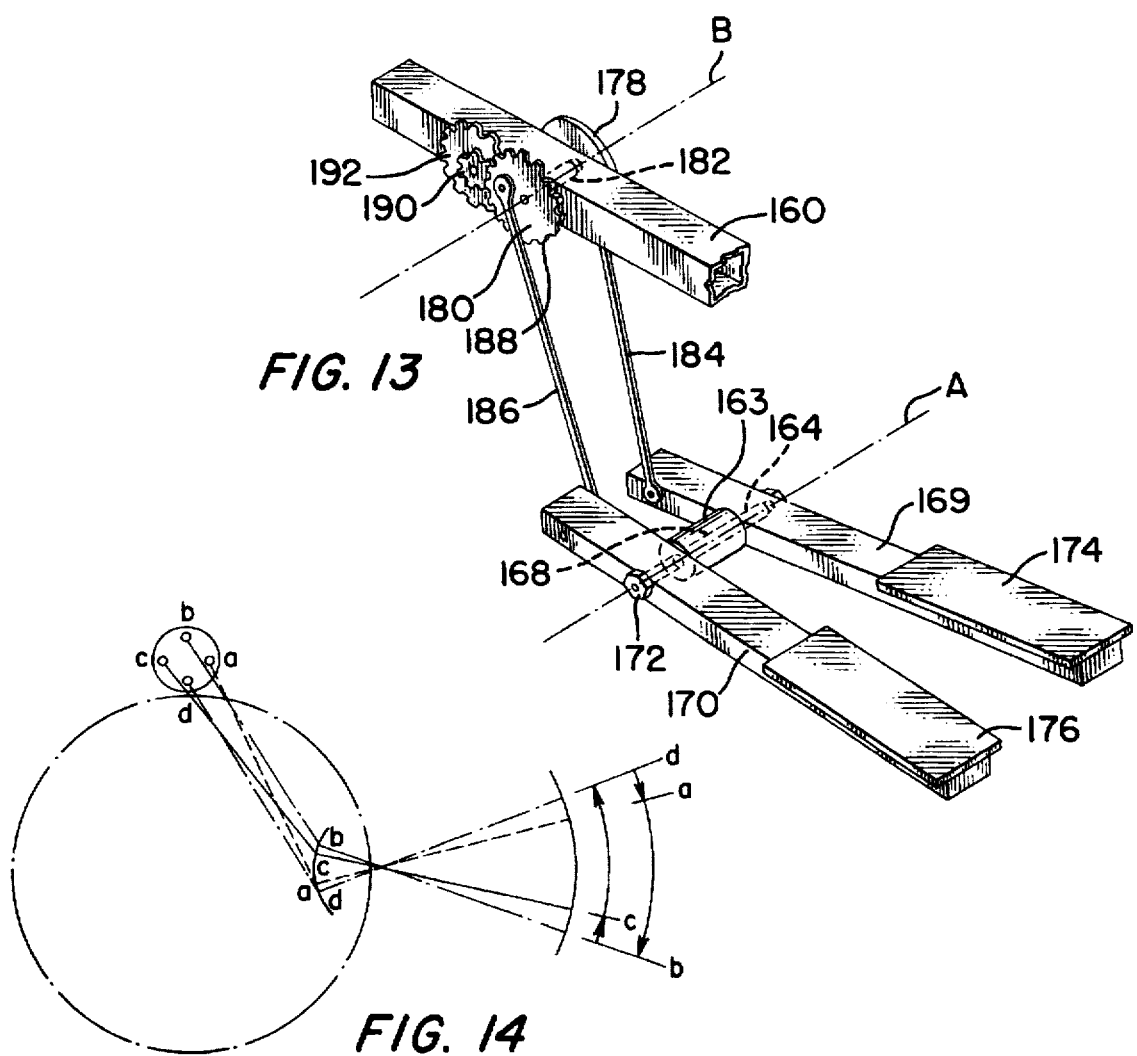
FIG. 13
FIG. 14

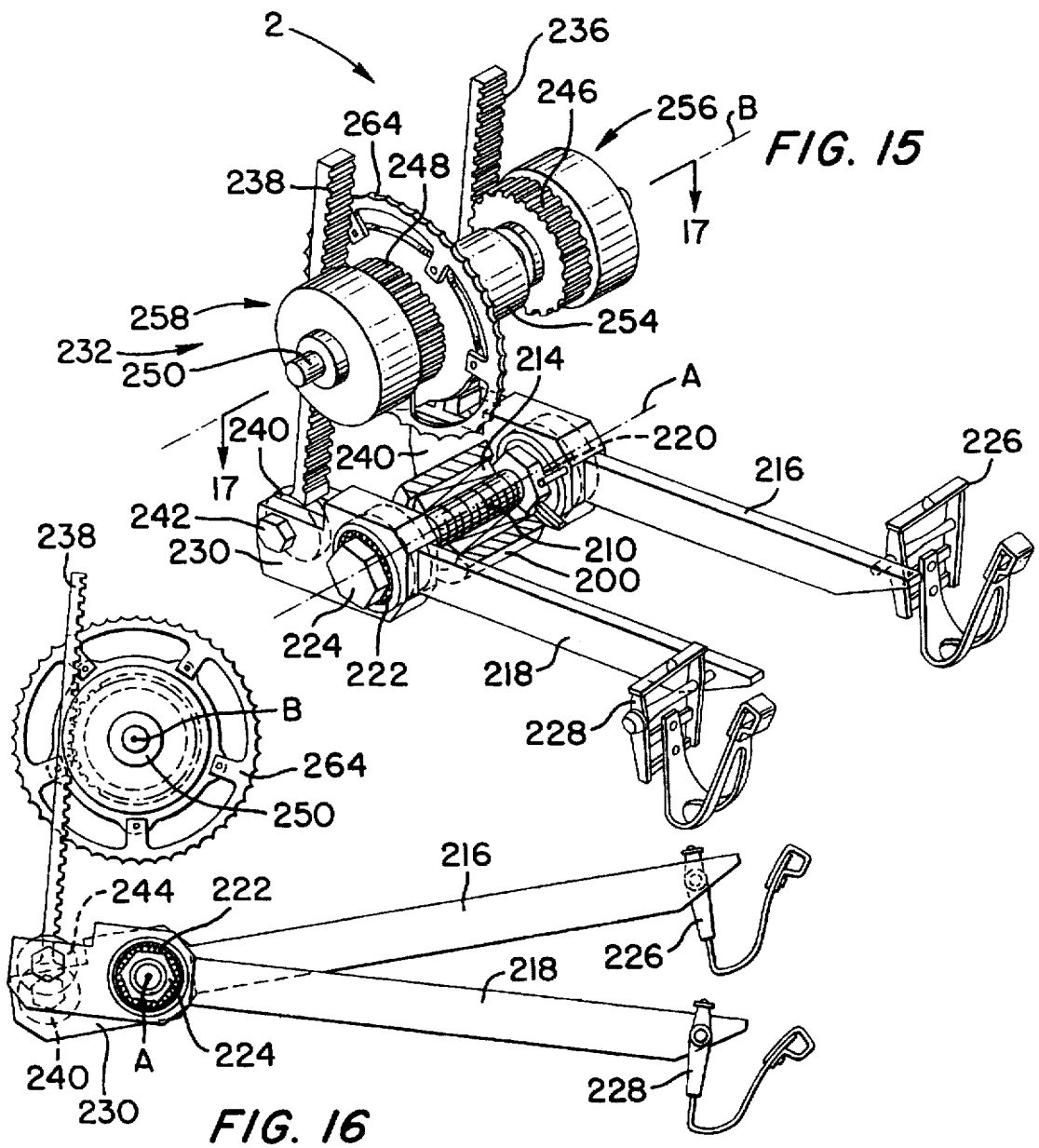
FIG. 15
FIG. 16
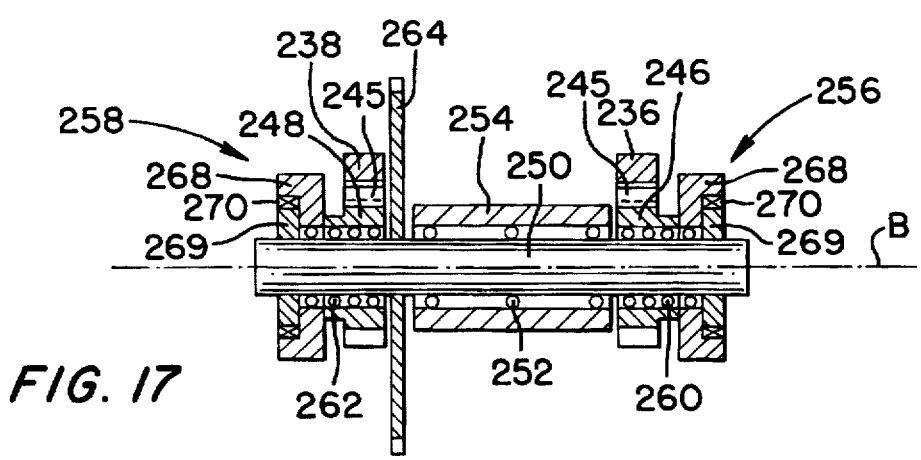
FIG. 17

1

MOTION TRANSFER MECHANISM FOR TRANSFERRING RECIPROCOL MOTION TO ROTARY MOTION

RELATED APPLICATIONS

This application is a continuation-in-part of application Ser. No. 08/116,391, filed Sep. 3, 1993, now U.S. Pat. No. 5,405,157 which is a continuation of application Ser. No. 07/804,768, filed Dec. 9, 1991, now U.S. Pat. No. 5,242,182.

FIELD OF THE INVENTION

The present invention relates generally to motion transfer mechanisms and, more particularly, to a motion transfer mechanism for transferring reciprocal motion to rotary motion and which is particularly suited for rider-propelled vehicles, exercise apparatus and the like.

BACKGROUND OF THE INVENTION

Over the years, a wide variety of rider-propelled vehicles and exercise apparatus have been devised. Among the more popular rider-propelled vehicles are bicycles, small recreational cars, paddle boats and lightweight airplanes. Conventional exercise apparatus for physical conditioning of the human body include stair climbers, stationary bicycles and other physical conditioning devices.

In many conventional rider-propelled vehicles, and most notably bicycles, a motion transfer mechanism for propelling the vehicle incorporates an axle located approximately midway between the front and rear wheels. Shafts extend perpendicularly from the axle, and pedals project from the end of the shafts outwardly from the bicycle. The pedals permit the rider to utilize the propulsive power generated by the human body. The axle typically carries a sprocket that engages a chain for driving the rear wheel, which propels the vehicle forward. Thus, the arrangement of the axle, shaft and pedals forces the rider to move his or her feet and legs in a circular peddling motion. Although this circular motion is effective in creating sufficient force to propel the vehicle forward, it does not do so efficiently.

The circular peddling motion required of the conventional motion transfer mechanism results in lost motion and wasted energy. The driving force that propels the vehicle is developed from the downward push of the rider's legs and feet along the circular path of travel of the pedals, and the circular path makes it difficult for the rider to exert a constant propulsive force. As a result, the rider is not able to pace himself or herself during a long journey. Additionally, the smoothness of operation of the vehicle is compromised since the transmission of force depends on the position of the pedals during their cycle of rotation, resulting in non-uniform transmission of force. Since the non-uniformity of the force transmission is independent of the speed of the vehicle, the non-uniformity is especially pronounced at low speeds.

Another problem with the aforementioned conventional motion transfer mechanism is that the pedals are driven in a circular motion with vertical and horizontal force components, thereby making the application of force to the pedals inefficient. As a result, a rider utilizes only a small portion of his body weight during propulsion of the vehicle. Therefore, the conventional motion transfer mechanism for transferring rotary motion of the pedals to rotary motion of the driven wheel has the drawbacks of ineffective transmission of force, poor mechanical advantage, low power output and high resistance. Rider-propelled vehicles equipped with such a conventional motion transfer mechanism thus require the application of substantial force in order for the rider to propel the vehicle, particularly when starting up or accelerating.

Similarly, exercise apparatus employing the conventional motion transfer mechanisms suffer many deficiencies including the inefficient application of muscle strength from the human body to the object of the exercise as well as lost power transference.

Motion transfer mechanisms used in rider-propelled vehicles and exercise apparatus driven by reciprocal upward and downward motion of levers have been proposed. However, the transmission of the reciprocal motion of the levers to drive the rider-propelled vehicle or the exercise apparatus has not been satisfactory. In particular, most rider-propelled vehicles and exercise apparatus of the class described are designed for use only by relatively strong and agile persons. As a consequence, the vehicle and exercise apparatus have certain features which render them difficult or impractical to use by many persons, such as persons having less than average agility or strength.

Wilburn U.S. Pat. No. 608,241 shows a mechanism using stirrups which are vertically reciprocated by the driver and are connected to a drive rack which meshes with a sprocket wheel or pinion connected to a drive wheel.

Price U.S. Pat. No. 384,543 discloses the use of levers or treadles pivoted at their forward ends and constructed to operate cranks which rotate pinions which mesh with second pinions connected to a driven wheel of the vehicle.

Thorp U.S. Pat. No. 436,844 discloses treadle levers which are connected directly to aligned crank-wheels which, by a complicated system of meshing gears and friction wheels, drive the driven wheel of the vehicle.

Booth et al. U.S. Pat. No. 594,980 shows a mechanism somewhat similar to that of Price, but the treadle or pedal levers replace pedals in the conventional type of drive and rotate the large front sprocket wheel which carries a chain which rotates the rear sprocket wheel and thus the rear wheel.

Greenison U.S. Pat. No. 1,427,589 uses levers or treadles which are pivoted to the vehicle frame and have elongated slots at their ends rearwardly of the rear wheel. The slots receive crank arms connected to a sprocket wheel which in turn drives a second sprocket wheel connected to the rear wheel of the vehicle. The levers carry pedals at their forward ends.

McNeill U.S. Pat. No. 1,505,271 constitutes a modification of the Greenison patent in which the levers are carried at the rear in slots in extensions of the vehicle frame and the sprocket cranks are provided with shafts passing through apertures in the levers.

Shelly U.S. Pat. No. 3,891,235 discloses a mechanism for a bicycle in which pedals are attached to a pair of chains, both of which are trained over ratchets incorporating sprockets on the driven bicycle wheel and movable in a vertical reciprocal motion, wherein the motion of the pair of chains reverses with each alternate movement of the pedals attached thereto.

In the foregoing prior art constructions using levers or treadles, relatively complicated arrangements are shown involving cranks, wear-prone slots, or some other similar construction which suffers from problems of friction and which usually require the application of substantial force.

The present invention overcomes many of the disadvantages inherent in the foregoing prior art motion transfer mechanisms by providing a motion transfer mechanism which simply and efficiently transfers reciprocal motion to rotary motion.

SUMMARY OF THE INVENTION

It is an object of the present invention to provide a motion transfer mechanism for transferring reciprocal motion to rotary motion in a manner which avoids the drawbacks and disadvantages of prior constructions.

It is another object of the present invention to provide a motion transfer mechanism for transferring reciprocal motion to rotary motion in which levers operate without friction wheels and without cranks slidable in friction-producing slots.

It is another object of the present invention to provide a motion transfer mechanism wherein reciprocal motion applied to pivoted levers is effectively transferred to rotary motion of an output member without requiring the application of substantial force.

It is another object of the present invention to provide a motion transfer mechanism for transferring reciprocal motion to rotary motion to propel a rider-propelled vehicle, characterized by a smooth and uniform transmission of force independent of the speed of the vehicle.

It is another object of the present invention to provide a motion transfer mechanism for transferring reciprocal motion to rotary motion to propel a rider-propelled vehicle, in which the transmission of force and the mechanical advantage are improved to reduce the effort which must be expended by the rider.

It is still another object of the present invention to provide a motion transfer mechanism for transferring reciprocal motion to rotary motion, wherein reciprocal motion of a pair of pivotal levers is transferred to rotary motion to propel a rider-propelled vehicle or to operate an exercise apparatus with efficient transfer of applied power and reduced resistance to power transfer.

SUMMARY OF THE INVENTION

The foregoing and other objects of the present invention are carried out by a motion transfer mechanism for transferring reciprocal motion to rotary motion. The motion transfer mechanism comprises at least one driving member rotatably mounted for reciprocal motion about a first axis, at least one rotary member rotatably mounted for rotating motion about a second axis, means interconnecting the driving member to the rotary member, driven means rotatably mounted for rotary motion in one direction of rotation, and transfer means drivingly connecting the rotary member to the driven means for transferring reciprocal motion of the driving member to rotary motion of the driven means in the one direction of rotation.

In another aspect, the present invention comprises a rider-propelled vehicle including a frame, a seat supported by the frame for seating a rider, rider actuated means rotatably mounted on the frame and movable by the action of the rider through reciprocal motion about a first axis, driven means rotatably mounted to the frame for rotary motion in one direction of rotation, at least one rotary member rotatably mounted on the frame for rotary motion about a second axis, means interconnecting the rider actuated means to the rotary member, and transfer means drivingly connecting the rotary member to the driven means for transferring reciprocal motion of the rider actuated means to rotary motion of the driven means in the one direction of rotation. Reciprocal motion imparted to the rider actuated means by a rider effects rotation of the rotary member to transfer the reciprocal motion to rotary motion of the driven means to thereby propel the vehicle.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangements and instrumentalities shown. In the drawings:

FIG. 1 is a side elevational view of a rider-propelled vehicle employing a motion transfer mechanism according to a first embodiment of the present invention;

FIG. 2 is an enlarged right side perspective view of the motion transfer mechanism according to the first embodiment of the present invention with the housing partially cut open;

FIG. 3 is a partial cross-sectional top view of the motion transfer mechanism looking downward in the direction of the line 3—3 in FIG. 2;

FIG. 4 is a right side view of the motion transfer mechanism of FIG. 2 shown mounted to the frame of a rider-propelled vehicle;

FIG. 5 is a front view of the motion transfer mechanism of FIG. 2 showing the housing in partial cross-section;

FIG. 6 is an enlarged front view of a motion transfer mechanism according to a second embodiment of the present invention showing the housing in partial cross-section;

FIG. 7 is an enlarged partial cross-sectional top view of a motion transfer mechanism according to a third embodiment of the present invention;

FIG. 8 is an enlarged side view of a motion transfer mechanism according to a fourth embodiment of the present invention mounted to the frame of a rider-propelled vehicle;

FIG. 12 is a side elevational view of a rider-propelled vehicle employing a motion transfer mechanism according to a seventh embodiment of the present invention;

FIG. 13 is an enlarged left side perspective view of the motion transfer mechanism according to the seventh embodiment of the present invention;

FIG. 14 is a diagrammatic view of the motion transfer mechanism shown in FIG. 13 illustrating how the movements of the levers relate to the rotation of the discs;

FIG. 15 is an enlarged left side perspective view of a motion transfer mechanism according to an eighth embodiment of the present invention;

FIG. 16 is a left side view of the motion transfer mechanism shown in FIG. 15;

FIG. 17 is a cross-sectional view taken along the lines 17—17 in FIG. 15;

DETAILED DESCRIPTION OF PREFERRED EMBODIMENTS

Figure 10:
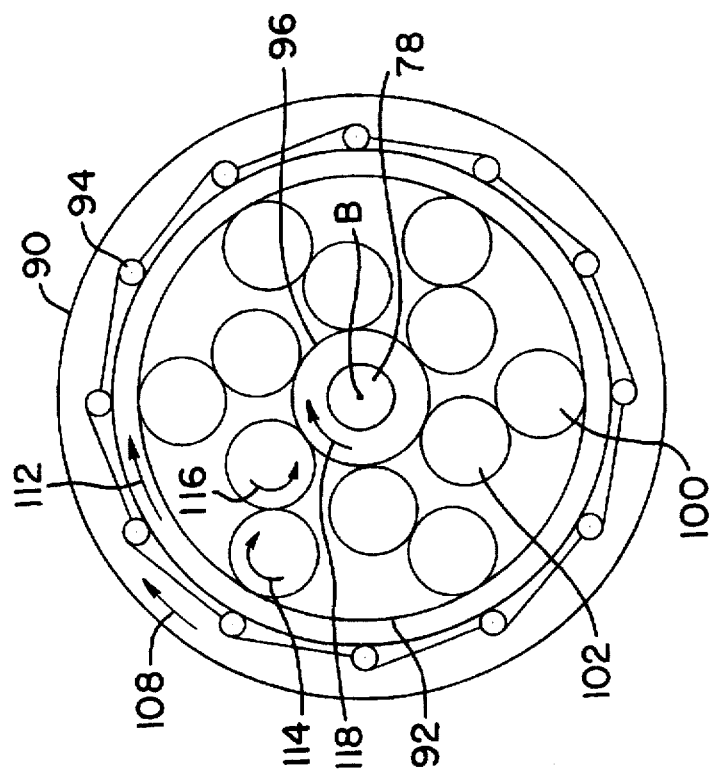
FIG. 10 is a cross-sectional view taken along the line 10—10 in FIG. 9.

While this invention is susceptible of embodiments in many different forms, this specification and the accompanying drawings disclose only some specific forms as examples of the use of the invention. The invention is not intended to be limited to the embodiments so described, and the scope of the invention will be pointed out in the appended claims.

The preferred embodiments of the motion transfer mechanism according to the present invention are described below with a specific application to a rider-propelled vehicle, particularly a stepper bicycle. However, it will be appreciated by those of ordinary skill in the art that the following preferred embodiments of the motion transfer mechanism are also particularly well adapted for other rider-propelled vehicles such as, for example, tricycles, small recreational cars, paddle boats lightweight airplanes and tandem vehicles. It will also be appreciated by those of ordinary skill in the art that the preferred embodiments described below are not limited for specific use in rider-propelled vehicles, but may also be employed in other apparatus requiring the transfer of reciprocal motion to rotary motion. For example, the preferred embodiments of the motion transfer mechanism are also particularly well adapted for exercise apparatus such as, for example, stair climbers, treadmills and other physical conditioning devices.

Certain terminology is used in the following description for convenience only and is not intended to be limiting. The words right, left, front, rear, upper, lower, inner, outer, rearwardly and forwardly designate directions in the drawing to which reference is made. Such terminology includes the words above specifically mentioned and words of similar import.

Referring now to the drawings in detail, wherein like numerals are used to indicate like elements throughout, there is shown in FIGS. 1–5 a first embodiment of a motion transfer mechanism, generally designated at 2, according to the principles of the present invention, employed in a bicycle, generally designated at 4. As shown in FIG. 1, the bicycle 4 has a frame which includes a head tube 6, a top tube 8, a downtube 10, a seat tube 12, chain stays 14 extending rearwardly from a junction of the seat tube 12 and the downtube 10, and a seat tube stay 16 extending rearwardly and downwardly from the seat tube 12 to a sprocket wheel 18 of a rear wheel 20. A front wheel 24 of conventional type is journalled in a front fork 26, and a handle bar 28 is connected to the front fork 26 for manual steering of the front wheel 24. A seat, such as a saddle 30, is mounted atop the seat tube 12, and the rear wheel 20, also of conventional form, is journalled in the rear stay end 32.

The frame components for the bicycle 4 are preferably formed of aluminum, titanium or chromium-molybdenum alloy, such as that marketed under the trademark Chromally. However, it will be understood by those skilled in the art that other materials, such as carbon fibers and composite materials, which exhibit high strength and light weight characteristics are suitable for the frame components.

FIG. 4 shows an enlarged side view of the motion transfer mechanism 2 mounted on the frame of the bicycle 4. The motion transfer mechanism 2 comprises a housing 22 in which are housed some of the mechanics of the drive unit of the motion transfer mechanism. The housing 22 is affixed to a lower portion of the seat tube 12, to a lower portion of the downtube 10 and to a front portion of the stays 14 through conventional connection methods, such as, for example, welding, brazing or bonding.

Reference is now made to FIGS. 2 and 3, showing an enlarged perspective view and a partial cross-sectional view, respectively, of the motion transfer mechanism 2 according to the present embodiment. Left and right driving members or levers 34, 36 having front and rear end portions terminating, respectively, in front and rear ends, are coupled to the frame of the bicycle for up-and-down movement. Specifically, a shaft 40 is supported within a bore 68 in the housing 22 and supports at opposite ends thereof rotary bearings 70 to enable pivotal movement of the levers 34,36 about a first or pivoting axis A extending along the axial direction of the shaft 40. The rear ends of the levers 34,36 are connected to left and right ends, respectively, of the shaft 40, which project out of the housing 22, for pivotal movement about the first axis A. Retaining elements 72 are attached to respective ends of the shaft 40 to prevent lateral displacement of the levers 34,36 in the axial direction of the shaft 40.

As best shown in FIG. 2, the rear end portion of each of the levers 34,36 has a generally V-shaped configuration having a sector-shaped opening 41 and a circular opening 35 in which is mounted one of the bearings 70. An elongated arm portion 43 extends forwardly from the rear end portion of each lever 34,36. The elongated arm portion 43 has a foot engaging surface 51 and has suitable openings 47,49 separated by a rib 53 to reduce the weight of the arm portion while retaining the strength thereof. The front end of each lever 34,36 is provided with an opening 55 which supports a pedal 37 as shown in FIG. 1. Preferably, the levers 34,36 are formed of aluminum. However, it is understood by those skilled in the art that other constructions and materials are suitable for the levers 34,36. For example, the levers may be of solid construction and formed of other materials exhibiting a high ratio of strength to weight, such as a metal matrix, carbon fibers or composite materials.

The levers 34,36 are interconnected with a drive unit mounted on the frame of the bicycle 4 which transfers reciprocal up-and-down motion of the levers about the first axis A to rotational motion of the rear wheel 20 in one direction of rotation to propel the bicycle forwardly. Details of the components of the drive unit according to the present embodiment for converting reciprocal up-and-down motion of the levers 34,36 to rotational motion of the rear wheel 20 of the bicycle 4 will be described with reference to FIGS. 2–5.

Referring first to FIG. 3, the drive unit comprises a rotary shaft 58 rotatably supported within the housing 22 for rotation about a second or rotating axis B disposed forwardly of and parallel to the first axis A defined by the shaft 40. As best shown in FIGS. 1 and 4, the second axis B extends through a junction of the downtube 10 and the seat tube 12, and the first and second axes preferably lie in a common horizontal plane when the motion transfer mechanism 2 is mounted on the frame of the bicycle 4.

Left and right unidirectional clutch assemblies 46 are disposed within the housing 22 and encircle the shaft 58 for effecting rotation of the rotary shaft 58 in a first direction (counterclockwise as viewed in FIGS. 2 and 4) as further described below.

The left and right unidirectional clutch assemblies 46 are connected through connecting portions 45 to left and right pinions 44, respectively, for rotation therewith about the second axis B. The right pinion 44 is disposed concentrically over, and slightly spaced from, a right end of the rotary shaft 58 which extends out of the right side of the housing 22. The right pinion 44 is provided with a toothed circumferential outer periphery 29 for driving engagement with a right arcuate toothed rack 42 disposed within the opening 41 of and fixed to the right lever 36. The left pinion 44 is likewise disposed concentrically over, and slightly spaced from, a left end of the rotary shaft 58 which extends out of the left end of the housing 22. The left pinion 44 is also provided with a toothed circumferential outer periphery 29 for driving engagement with a left arcuate toothed rack 42 disposed within the opening 41 of and fixed to the left lever 34.

The left and right sets of pinions 44 and unidirectional clutch assemblies 46 are respectively integrally connected through the connecting portions 45 to undergo angular displacement as units relative to the rotary shaft 58. As described below, the two unidirectional clutch assemblies 46 alternately engage and disengage with the rotary shaft 58 in response to reciprocal up-and-down movement of the levers 34,36 to rotationally drive the rotary shaft 58 in one direction. In this embodiment, the left pinion 44 and left clutch assembly 46 are integrally connected as a unit and rotatably supported by a ball bearing 66 disposed between the outer circumference of the unidirectional clutch assembly and the inner wall surface of the housing 22. Similarly, the right pinion 44 and right clutch assembly 46 are integrally connected as a unit and rotatably supported by a ball bearing 66.

Each unidirectional clutch assembly 46 comprises, as shown in FIG. 3, a hollow cylindrical clutch housing 52 integrally connected to the pinion 44, a cylindrical friction block 54 disposed within the clutch housing concentrically with the rotary shaft 58, and a clutch element 56 disposed between the clutch housing 52 and the friction block 54. The clutch element 56 preferably comprises a cylindrical member having wedge-shaped grooves in which are disposed cylindrical rollers which move into and out of engagement with the friction block 54 depending on the direction of rotation of the clutch housing 52, as well known in the clutch art. The clutch element 56 is attached to the inner circumferential surface of the clutch housing 52 for displacement therewith. As shown in FIGS. 3 and 5, the pinion 44 is integrally connected to the clutch housing 52 through a connecting collar 45. However, it is understood by those skilled in the art that other forms of integral connections are suitable between the pinion 44 and the clutch housing 52. For example, the pinion 44 and the clutch housing 52 may each be provided with tubular extensions which are connected in a fixed manner by welding, set screws or the like, or both elements may be formed as one piece.

The following description relates to both the left and right unidirectional clutch assemblies 46 and corresponding pinions 44. The clutch element 56 transmits a drive force, resulting from a rotational drive force imparted to the pinion 44, to the rotary shaft 58 in only one direction of rotation, i.e., in the first direction (counterclockwise as viewed in FIGS. 2 and 4). The friction block 54 is keyed or otherwise fixed to the rotary shaft 58 for rotation therewith by, for example, a conventional key-and-groove connection indicated by dashed lines 59 shown in FIG. 4. Thus, angular displacement of the pinion 44 in the first direction effects corresponding angular displacement of the clutch housing 52 in the first direction, and the angular displacement of the housing 52 is transmitted to the rotary shaft 58 by releasable clutching engagement of the clutch element 56 with the friction block 54 to thereby rotate the rotary shaft in the first direction. On the other hand, angular displacement of the pinion 44 in a second direction (clockwise as viewed in FIGS. 2 and 4) causes the clutch element 56 to slip freely around the outer circumferential surface of the friction block 54 so that no drive force is transmitted to the friction block, and thus the rotary shaft 58 is not rotated in the second direction.

A separating element 60 in the form of a cylindrical abutment maintains the two unidirectional clutch assemblies 46,46 spaced-apart from each other along the axis of the rotary shaft 58. The unidirectional clutch assemblies 46,46 are prevented from moving axially outwardly by means of retaining elements 62, such as snap rings, fitted on the ends of the housings 52. The separating element 60 and the retaining elements 62 maintain the unidirectional clutch assemblies fixedly positioned within the housing 22 and fixed in the axial direction of the rotary shaft 58.

It will be appreciated from the above construction of the motion transfer mechanism 2 of the present embodiment that the rotary shaft 58, the pinions 44, the clutch housings 52, the clutch elements 56 and the friction blocks 54 are all coaxial with the second axis B which is defined by the center axis of the shaft 58. This feature advantageously provides for a compact and dynamically balanced motion transfer mechanism.

Referring now to FIGS. 2–4 and to the motion transfer mechanism 2 in general, the right toothed rack 42 meshes with the toothed periphery 29 of the right pinion 44 to interconnect the right lever 36 to the right pinion 44 in driving engagement, such that reciprocal motion of the right lever 34 about the first axis A effects corresponding reciprocal rotating motion of the right pinion 44 about the second axis B. The left toothed rack 42, the left pinion 44 and the left lever 36 cooperate in the same manner as described above for the right toothed rack 42, the right pinion 44 and the right lever 34.

From the above construction, it will be appreciated that when the levers 34,36 are assembled onto the drive unit such that the rear end of each lever is pivotally connected to a respective end of the shaft 40 and the toothed racks 42 meshingly engage the toothed peripheries 29 of the pinions 44, angular displacement of the levers is limited to a relatively small angle about the first axis A. To prevent the pinions 44 from striking the upper and lower walls which define the openings 41 of the levers 34,36, which would damage the gear teeth and impart jolting shocks to the motion transfer mechanism 2, stoppers (not shown) are connected to the seat tube 12 or elsewhere on the frame and abut with the levers 34,36 to limit the upward and downward strokes thereof. In this manner, the upward and downward strokes of the levers 34,36 are predetermined and limited to prevent the levers from striking the pinions 44. Any suitable stoppers may be employed, and the stoppers preferably have shock-absorbing properties to absorb the impact forces. If desired, the levers 34,36 may be coupled together through a pulley or the like (described below) to undergo synchronous up-and-down movement. In that case, it may be possible to employ only one stopper, such as an upper stopper, since the downward stroke of each lever will be restricted by the upward stroke of the other lever.

Referring again to FIG. 3, a chain sprocket 48 is connected to the left end of the rotary shaft 58 through conventional keying elements (not shown) for rotation therewith in only the first direction of rotation. A bearing 67 separates the chain sprocket 48 from the pinion 44 to permit frictionless driving of the sprocket wheel during reciprocating movement of the levers 34,36 as further described below. A chain 50 (FIG. 1) connects the chain sprocket 48 to the sprocket wheel 18 attached to the rear wheel 20 of the bicycle 4.

The shaft 40, the rotary shaft 58, the pinions 44, the toothed racks 42, the clutch housings 52 and the friction blocks 54 are preferably formed of titanium or steel. The cylindrical rollers of the clutch elements 56 are preferably formed of hardened chrome steel. However, it will be understood by those of ordinary skill in the art that other materials are suitable for the components of the drive unit. For example, some or all of the components of the drive unit may be formed of a metal matrix or assorted variations of steel which exhibit a high ratio of strength to weight.

In order to facilitate alternate reciprocal motion of the levers 34,36 during use of the bicycle 4, the levers are coupled together to undergo synchronous movement by a lever return mechanism, such as a pulley-and-cable arrangement (not shown). With this arrangement, a pulley is secured to the top tube 8 of the bicycle frame, and a cable is connected at one end to the front end of one of the levers and passes up over the pulley and then downwardly and is connected at its other end to the other lever. By such an arrangement, when the left lever 34 is moved downwardly, the right lever 36 will be synchronously raised, and when the right lever 36 is moved downwardly, the left lever 34 will be synchronously raised. It will be appreciate by those skilled in the art that other lever return mechanisms which facilitate the alternate reciprocal motion of the levers 34,36 during use of the bicycle may be used without departing from the spirit and scope of the invention.

Operation of the motion transfer mechanism 2 to propel the bicycle 4 will be explained below with reference to FIGS. 1–3. Alternate actuation of the levers 34,36 by the rider in a downward direction about the first axis A defined by the shaft 40 alternately pivots the left and right toothed racks 42 in a downward direction. The meshing engagement between the toothed racks 42 and the toothed peripheries 29 of the pinions 44 effects angular displacement of the pinions 44, and thus the clutch housings 52, in the first direction of rotation (for example, counterclockwise as viewed in FIGS. 1, 2 and 4) about the second axis B. The drive forces of the pinions 44 are transmitted by the clutch elements 56 and friction blocks 54 of the unidirectional clutch assemblies 46 to the rotary shaft 58, which is thereby continuously rotationally driven in the first (counterclockwise) direction of rotation to rotationally drive the chain sprocket 48. As shown in FIG. 1, the chain 50, which passes over the chain sprocket 48 and rear wheel sprocket 18, transmits the counterclockwise rotational motion of the chain sprocket 48 to drive the rear wheel 20 of the bicycle 4 in the first (counterclockwise) direction of rotation. On the other hand, upward motion of the levers 34,36 is not transmitted to the rotary shaft 58. Instead, during the upward strokes of the levers 34,36, the clutch assemblies 46 de-clutch or disengage the pinions 44 from the rotary shaft 58 so that the clockwise rotation of the pinions 44 is not transmitted to the shaft 58. Stated otherwise, the clutch assemblies 46 free-wheel relative to the rotary shaft 58 when the pinions 44 and clutch housings 52 are angularly displaced in the second (clockwise) direction. Furthermore, it will be appreciated that as a result of coupling the levers 34,36 through the lever return mechanism (not shown), the reciprocal back-and-forth motions of the levers 34,36 are synchronized with each other, facilitating alternate reciprocal motion of the levers during use of the bicycle 4.

With the foregoing arrangement, it will be appreciated that reciprocal up-and-down motion of the levers 34,36 by a rider will drive the rear wheel 20 of the bicycle 4 in the first direction of rotation to propel the bicycle 4 forwardly.

It will be appreciated by those skilled in the art that in the simplified construction of the motion transfer mechanism 2 according to this embodiment, the reciprocal up-and-down motion of the levers 34,36 is accomplished without substantially increasing the overall size and weight of the bicycle. A compact and dynamically balanced motion transfer mechanism is achieved by disposing the unidirectional clutch assemblies 46 within the housing 22 and by disposing the rotary shaft 58, the pinions 44, the clutch housings 52, the clutch elements 56 and the friction blocks 54 all coaxially with the second axis B. In addition to the foregoing feature, it will be understood that the stroke of the levers 34,36 is not confined to any specific value except for the distance between the top and bottom walls of the sector-shaped openings 41 at the rear end portion of the levers and the dimensions of the arcuate toothed racks 42. Thus, a rider could alternate with various short strokes or could use the full stroke of each lever. This advantage is, in part, a consequence of utilizing independent left and right unidirectional clutch assemblies 46 for driving the chain sprocket 48 which in turn drives the rear wheel 20.

A second embodiment of the motion transfer mechanism 2, according to the present invention, as shown in FIG. 6, comprises the elements described above with reference to the embodiment of FIGS. 1–5. However, in the present embodiment, the rotary shaft 58 is supported by a bearing 66 within the housing 22 for rotation in the first direction. The chain sprocket 48 is connected to the rotary shaft 58 for rotation therewith between a left end of the housing 22 and the left lever 34. The left and right unidirectional clutch assemblies 46,46 are disposed outside of the housing 22 and are mounted on left and right ends, respectively, of the rotary shaft 58 in the manner described above with reference to the embodiment of FIGS. 1–5 for effecting rotation of the rotary shaft 58 in the first direction of rotation. Rotation of the rotary shaft 58 in turn rotates the chain sprocket 48 to thereby drive the rear wheel 20 of the bicycle 4 through the chain 50 in the first direction of rotation to propel the bicycle forwardly, as described above with reference to the embodiment of FIGS. 1–5.

FIG. 7 shows a third embodiment of the motion transfer mechanism according to the present invention. The first axis A, the second axis B, and the first direction of rotation described above with reference to the embodiment of FIGS. 1–6 are applicable in the present embodiment. The rotary shaft 58 is supported by the bearing 66 within the housing 22 for rotation in the first direction. Right and left chain sprockets 74,76 are connected to right and left ends of the rotary shaft 58, respectively, through conventional keying elements (not shown) for rotation therewith in only the first direction of rotation.

It will readily be understood by those skilled in the art that for the present embodiment, the bicycle 4 described above with reference to the embodiment of FIGS. 1–5 would be modified by providing right and left sprocket wheels 18 rotatably mounted to the frame of the bicycle on either side of the rear wheel 20. Right and left chains (not shown) pass over the right chain sprocket 74 and the right sprocket wheel 18 and over the left chain sprocket 76 and the left sprocket wheel 18, respectively.

Left and right unidirectional clutch assemblies are mounted on left and right ends of the rotary shaft 58, respectively, between respective left and right sides of the housing 22 and left and right chain sprockets 74,76. Each of the unidirectional clutch assemblies comprises a hollow cylindrical clutch housing 47 having a toothed outer circumferential surface 49, a cylindrical friction block 54 disposed within the housing concentrically with the rotary shaft 58 and a clutch element 56 disposed between the clutch housing 47 and the friction block 54.

The clutch element 56 transmits a drive force resulting from a rotational drive force applied to the clutch housing 47 to the rotary shaft 58 in only one direction, i.e., in the first direction (counterclockwise as viewed in FIGS. 2 and 4). The friction block 54 is keyed or otherwise fixed to the rotary shaft 58 for rotation therewith by, for example, conventional key-and-groove elements (not shown). Thus, rotation of the clutch housing 47 in the first direction about the second axis B, defined by the rotary shaft 58, is transmitted to the rotary shaft 58 by releasable engagement of the clutch element 56 with the friction block 54 to thereby rotate the rotary shaft 58 in the first direction. On the other hand, rotation of the clutch housing 47 in a second direction (clockwise as viewed in FIGS. 2 and 4) causes the clutch element 56 to slip freely around the outer circumferential surface of the friction block 54 so that no drive force is transmitted to the friction block, and thus the rotary shaft 58 is not rotated in the second direction.

The connections of the right and left levers 34,36 to the right and left ends, respectively, of the shaft 40 for reciprocal up-and-down motion about the first axis A defined by the shaft 40 are the same as described above with reference to the embodiment of FIGS. 1–5. Each of the levers 34,36 is provided with arcuate toothed racks which mesh in driving engagement with the toothed surface 49 of the clutch housing 47 in a manner similar to the meshing connection between the arcuate toothed racks 42 and the toothed surface 29 of the pinions 44 in the embodiment of FIGS. 1–5. Therefore, a detailed description thereof need not be set forth.

From the foregoing construction, it will be appreciated that the rotary shaft 58, the clutch housings 47, the clutch elements 56, the friction blocks 54 and the chain sprockets 74,76 are all coaxial with the second axis B which is defined by the center axis of the rotary shaft 58. This feature provides for a symmetrical and dynamically balanced motion transfer mechanism.

Alternate activation of the levers 34,36 by the rider in a downward direction about the first axis A defined by the shaft 40 pivots the toothed rack in a downward direction. The meshing engagement between the toothed rack and the toothed surface 47 of the clutch housing 47 effects angular displacement of the clutch housing 47 in the first direction (counterclockwise) about the second axis B defined by the rotary shaft 58. The drive force of the clutch housings 47 is transmitted by the clutch elements 56 and friction blocks 54 of the unidirectional clutch assemblies to the rotary shaft 58 which is thereby rotationally in the first direction (counterclockwise) to rotationally drive the chain sprockets 74,76 in the first direction of rotation. Chains (not shown) passing over corresponding chain sprockets 74,76 and sprocket wheels 18 transmit the counterclockwise rotational motion of the chain sprockets to drive the rear wheel 20 of the bicycle 4 in the first (counterclockwise) direction of rotation. On the other hand, upward motion of either lever 34,36 is isolated by the unidirectional clutch assemblies, thereby permitting only unidirectional rotation, i.e., in the first direction, of the rotary shaft 58 and the chain sprockets 74,76. The levers 34,36 may be coupled through a lever return mechanism (not shown) as described above with respect to the embodiment of FIGS. 1–5.

An important advantage of the present embodiment resides in the fact that a balancing of the driving of the rear wheel 2 of the bicycle 4 takes place due to the symmetrical nature of the motion transfer mechanism. That is, in conventional bicycles using rotary pedals, as well as those prior art bicycles proposed wherein an up-and-down motion of the levers takes place, the drive to the rear wheel is necessarily along one side of the frame; that is, it is offset from the center line or center of gravity of the bicycle. As a result, there exists a pronounced biasing force tending to tilt the bicycle more to one side than the other, which must be compensated for by the rider. On the other hand, the symmetrical nature of the motion transfer mechanism according to the present invention eliminates this biasing force and permits the rider to evenly shift the pedaling force from one side of the bicycle to the other as each lever 34,36 is alternately forced downwardly.

A fourth embodiment of the motion transfer mechanism 2 according to the present invention, as shown in FIG. 8, comprises the elements described above with reference to the embodiment of FIGS. 1–5. However, in the present embodiment the first axis A defined by the shaft 40 is disposed forwardly of the second axis B defined by the rotary shaft 58 and extends through a junction of the downtube 10 and the seat tube 12 of the frame of the bicycle 4. As with the embodiment of FIGS. 1–5, the first and axis A second axis B preferably lie in a common horizontal plane when the motion transfer mechanism 2 is assembled on the bicycle 4.

The manner of operation of the motion transfer mechanism 2 according to the present embodiment is identical to the operation of the motion transfer mechanism described above with reference to the embodiment of FIGS. 1–5 and, therefore, a description thereof need not be set forth.

It will be appreciated by those of ordinary skill in the art that in the embodiments of the motion transfer mechanism described above with respect to FIGS. 1–8, since the shaft 40 engages the levers 34,36 at a point much closer to the rear ends of the levers than to their forward ends (i.e., the first axis A is closer to the rear end of the levers than to their forward ends), a relatively light force applied to the front ends of the levers will cause a substantially greater propelling force of the bicycle. Furthermore, the relatively long lever arm portions 43 permit the rider to direct a downward force upon the levers in the most efficient manner possible.

The materials for the components of the motion transfer mechanisms described above with respect to the embodiments of FIGS. 6–8 are the same as the materials described above with respect to the embodiment of FIGS. 1–5.

Figure 9:
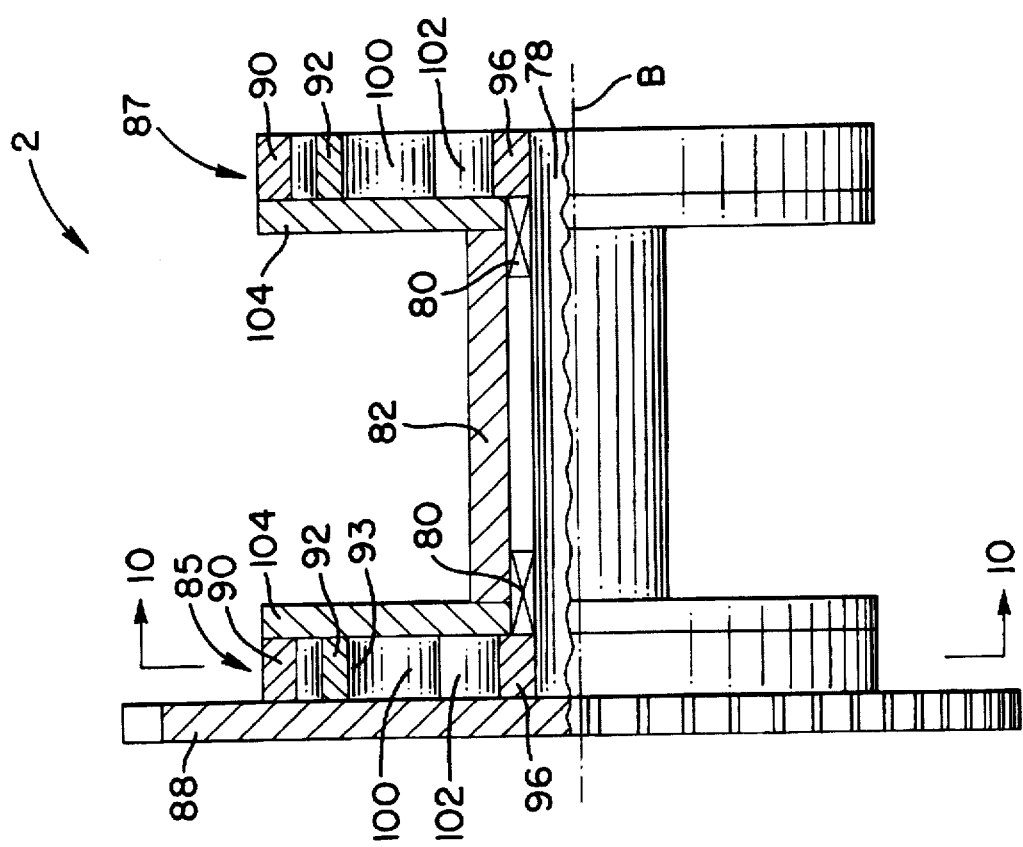
FIG. 9 is an enlarged partial front cross-sectional view of a motion transfer mechanism according to a fifth embodiment of the present invention.

FIGS. 9–10 show a fifth embodiment of a motion transfer mechanism according to the present invention employing a variation of the drive unit shown in the embodiment of FIG. 7.

Referring first to FIG. 9, a driven member or rotary shaft 78 is supported by bearings 80 within a stationary housing 82. The stationary housing 82 is fixed to the frame of a rider-propelled vehicle, such as a bicycle, in the manner described above with reference to the embodiment of FIGS. 1–8. Left and right levers (not shown) are connected to the stationary housing 82 for reciprocal up-and-down motion about a first axis A and drivingly connected to left and right ends, respectively, of the rotary shaft 78 through left and right unidirectional clutch assemblies 85,87, respectively, which undergo angular displacement about a second axis B defined by a center axis of the rotary shaft 78 as described above with respect to the embodiment of FIG. 7.

According to the present embodiment, the left and right unidirectional clutch assemblies 85,87 coact with left and right planetary gear assemblies, respectively, to rotate the rotary shaft 78 in only one direction during reciprocal up-and-down motion of the levers. A chain sprocket 88 is connected to a left end of the rotary shaft 78 for rotation therewith. It will understood by those skilled in the art, however, that two chain sprockets may be employed in the present embodiment in the same manner described above with reference to the embodiment of FIG.. 7.

FIG. 10 shows a cross-sectional view of the left unidirectional clutch assembly 85 shown in FIG. 9. The unidirectional clutch assembly 85 comprises a rotary member in the form of a hollow cylindrical clutch housing 90 which may be provided, for example, with a toothed outer circumferential surface (not shown) for driving engagement with the left lever 34 to undergo angular displacement about the second axis B as described above with reference to the embodiments of FIGS. 1–8. A hollow cylindrical internal gear 92 having a toothed inner circumferential surface 93 is disposed within the clutch housing 90 concentrically with the rotary shaft 78. A clutch element 94 is disposed between an inner circumferential surface of the clutch housing 90 and an outer circumferential surface of the internal gear 92. The clutch element 94 is attached to the inner circumferential surface of the clutch housing 90.

The planetary gear assembly comprises a hollow internal gear or sun gear 96 having a toothed outer circumferential surface and connected at its inner circumference to the rotary shaft 78 for rotation therewith. A first set of pinions 100 having toothed outer circumferential surfaces are spaced equally around and connected in driving engagement with the inner circumference of the internal gear 92. A second set of pinions 102 having toothed outer circumferential surfaces are spaced equally around and connected in driving engagement with the outer circumference of the internal gear 96 and with the first set of pinions 100.

Referring to FIGS. 9–10, the internal gear 92, the first and second sets of pinions 100,102 and the internal gear 96 are mounted on a gear support plate 104 in a conventional manner for relative rotation therewith. The gear support plate 104 is connected to a left side of the stationary housing 82 and, therefore, also remains stationary during angular displacement of the clutch housing 90.

The construction of the right unidirectional clutch assembly 87 and corresponding planetary gear assembly is identical to that of the left unidirectional clutch assembly 85 and corresponding planetary gear assembly discussed above, and, therefore, a detailed description thereof need not be set forth.

Operation of the motion transfer mechanism according to the present embodiment will be explained with reference to FIG. 10. Alternate actuation of the levers (not shown) in a downward direction about the first axis A (not shown) effects angular displacement of the clutch housing 90 in a first direction, i.e., clockwise as viewed by arrow 108. The clutch element 94 transmits a rotational drive force to the internal gear 92 in the first direction, as shown by arrow 112. Rotation of the internal gear 92 is then transmitted by the first and second set of pinions 100,102 through meshing engagement to the internal gear 96 and to the rotary shaft 78 to rotationally drive the chain sprocket 88 in the first direction (clockwise). That is, rotation of the external gear 92 in the first direction rotationally drives the first set of pinions 100 in the first direction, as shown by arrow 114. Rotation of the first set of pinions 100 in the first direction rotationally drives the second set of pinions 102 in a second direction, counterclockwise as shown by arrow 116, which in turn rotationally drives the internal gear 96 and the rotary shaft 78 in the first direction, as shown by arrow 118.

Thus, during alternate displacement of the levers in a downward direction, the external gear 92 drives the pinions 100, 102, the internal gear 96 and the rotary shaft 78 to rotationally drive the chain sprocket 88 in the first direction (clockwise). On the other hand, upward motion of either lever is isolated by the clutch elements 94, thereby permitting only unidirectional rotation in the first or clockwise direction of the rotary shaft 78 and the chain sprocket 88.

When the motion transfer mechanism according to the present invention is assembled in a rider-propelled vehicle, such as a bicycle 4, for example, as described above with reference to the embodiment of FIGS. 1–8, alternate up-and-down motion of the levers will propel the bicycle in a forward direction. That is, a chain (not shown) passing over the chain sprocket 88 and the sprocket wheel of the bicycle 4 transmits the rotation of the chain sprocket 88 to drive the rear wheel 2 of the bicycle in the first or clockwise direction to propel the bicycle forwardly.

It will be understood by those skilled in the art that although the present embodiment provides two sets of pinions 100, 102, with each set comprising six pinions for a total of twelve pinions disposed between the inner circumference of the internal gear 92 and the outer circumference of the internal gear 96, any suitable number of pinions could be employed as long as rotational drive of the internal gear 92 in the first direction (clockwise direction) will drive the internal gear 96 and, therefore, the rotary shaft 78 and chain sprocket 88, in the first or clockwise direction.

It will be appreciated by those skilled in the art that the application of planetary gear assemblies permits the driving force between the internal gear 92 and the internal gear 96 to be distributed over a number of pinions, such as twelve pinions in the present embodiment. This reduces the stresses applied to the internal gears 92,96, allowing for the production of a narrow and compact design of the motion transfer mechanism.

Figure 11:
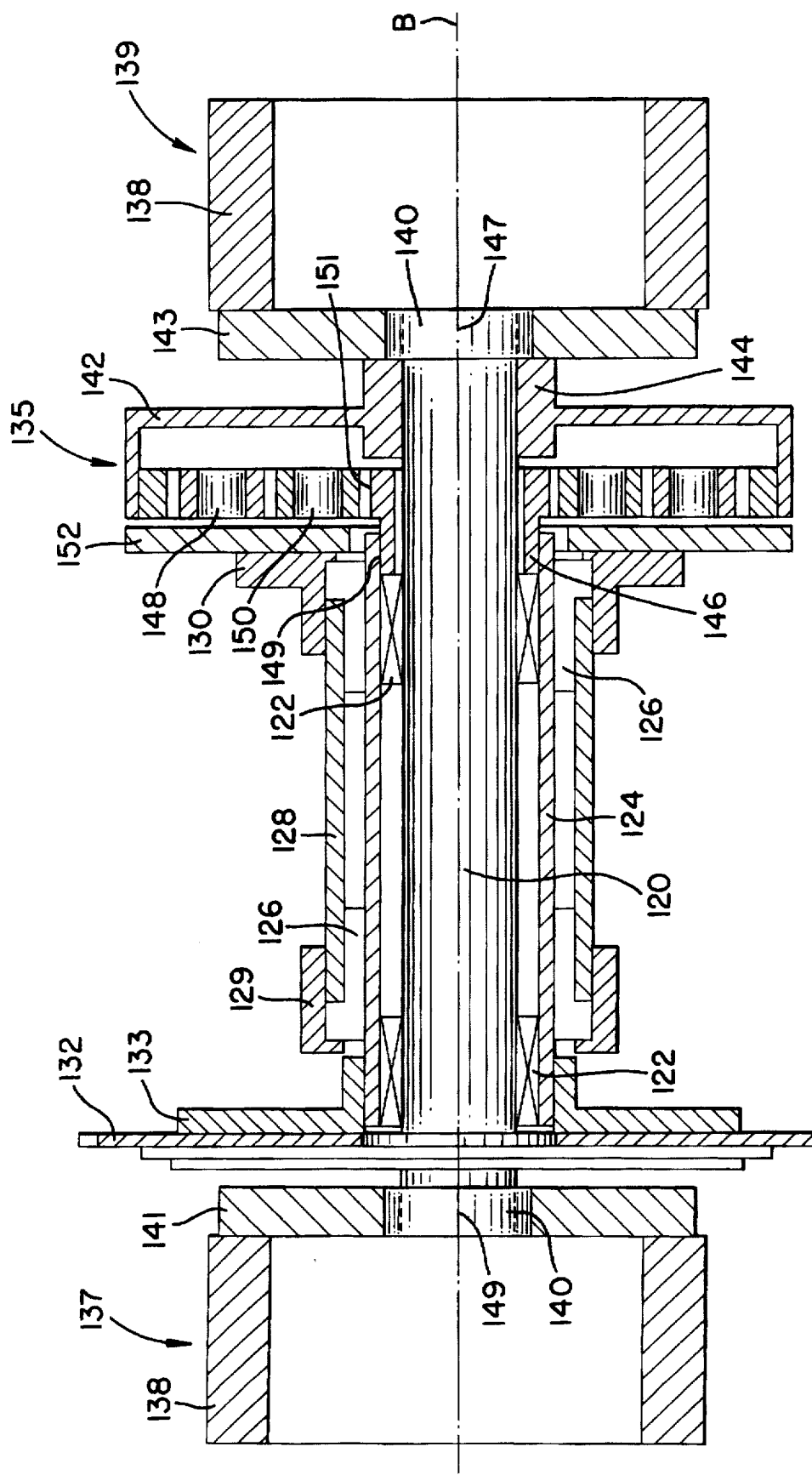
FIG. 11 is an enlarged partial front cross-sectional view of a motion transfer mechanism according to a sixth embodiment of the present invention.

FIG. 11 shows a sixth embodiment of a motion transfer mechanism according to the present invention employing another variation of the drive units shown in the embodiments of FIGS. 7 and 9–10. A first rotary shaft 120 is supported by bearings 122 within a second, hollow rotary shaft 124 for relative rotation therein. The second rotary shaft 124 is supported by bearings 126 within a stationary housing 128 concentrically with the first rotary shaft 120. The stationary housing 128 is fixed to the frame of a rider-propelled Vehicle, such as a bicycle, for example, in the manner described above with reference to the embodiment of FIGS. 1–5. End caps 129,130 prevent the bearings 126 from displacing axially within the stationary housing 128. A chain sprocket 132 is connected by a sprocket support member 133 to a left end of the second rotary shaft 124 for rotation therewith. It will understood by those skilled in the art, however, that two chain sprockets may be employed in the present embodiment in the same manner described above with respect to the embodiment of FIG. 7.

Although not shown in FIG. 11, left and right levers are pivotally connected at rear end portions thereof to the stationary housing 128 for reciprocal up-and-down motion about a first axis A, and are drivingly connected to left and right ends, respectively, of the first rotary shaft 120 through left and right unidirectional clutch assemblies 137,139, respectively, which undergo angular displacement about a second axis B defined by a center axis of the first rotary shaft 120, as described above with respect to the embodiments of FIGS. 7 and 9-10.

According to the present embodiment, the right unidirectional clutch assembly 139 coacts with a planetary gear assembly 135 to effect rotary motion of the second rotary shaft 124 about the second axis B in only one direction, i.e., in a first or counterclockwise direction when viewing the drive unit from a left end, during reciprocal up-and-down motion of the levers about the second axis B.

The right unidirectional clutch assembly 139 comprises a hollow cylindrical clutch housing 138 which may be provided, for example, with a toothed outer circumferential surface (not shown) for driving engagement with the right lever in the manner described above with reference to the embodiment of FIGS. 9-10. A hollow cylindrical flange portion 143 is integrally connected to the clutch housing 138 for angular displacement therewith by welding or other suitable connecting means permitting the flange portion and the clutch housing to undergo angular displacement as an integral unit. Alternatively, the flange portion 143 may be formed with the clutch housing 138 as one piece.

The flange portion 143 is mounted concentrically with the right end of the first rotary shaft 120 through a cylindrical friction block 147 in the same manner that the clutch housing 52 and the friction block 54 are mounted on the rotational shaft 58 in the embodiment of FIGS. 1-5. A clutch element 140 is disposed between the flange portion 143 and the friction block 147. Preferably, the clutch element 140 is attached to an inner circumferential surface of the flange portion 143. During a downward stroke of the right lever, the clutch housing 138 and the flange portion 143 undergo angular displacement in the first direction (counterclockwise) and the clutch element 140 transmits a rotational driving force from the flange portion 143 to the first rotary shaft 120 in the first direction. On the other hand, during an upward stroke of the lever, the clutch element 140 slips freely around the outer circumferential surface of the friction block 147 and isolates the driving force of the flange portion 143 so that no drive force is transmitted to the first rotary shaft 120 in the first direction.

The construction of the left unidirectional clutch assembly 137 is identical to that of the left unidirectional clutch assembly 139, and, therefore, a detailed description thereof need not be set forth.

The planetary gear assembly 135 comprises a hollow gear housing 142 integrally connected by a sleeve 144 to the first rotary shaft 120 for rotation therewith and is provided with a toothed inner circumferential surface (not shown). A hollow internal gear or sun gear 146 has a first toothed circumferential surface portion 149 connecting the internal gear 146 to the second rotary shaft 124 for rotation therewith, and a second toothed circumferential surface portion 151. The internal gear 146 is mounted concentrically with and spaced from an outer circumferential surface of the first rotary shaft 120. First and second sets of pinions 148,150 are disposed within the gear housing 142 and in driving engagement with the gear housing 142 and the second toothed circumferential surface portion 151 of the gear 146 in the same manner the pinions 100,102 drivingly engage the internal gears 92 and 96 in the embodiment described above with reference to FIGS. 9-10. The first and second sets of pinions 148,150 are rotatably mounted on a gear support plate 152 in a conventional manner. The gear support plate 152 is connected by an end cap 130 to a left side of the stationary housing 128 and, therefore, also remains stationary during angular displacement of the clutch housing 142.

It will be appreciated from the foregoing construction of the present embodiment that the clutch housing 138, the flange portion 143, the first rotary shaft 120, the sleeve 144, the gear housing 142, the internal gear 146 and the second rotary shaft 124 are all coaxial with the second axis B which is defined by the center axis of the first rotary shaft 120.

Operation of the motion transfer mechanism according to this embodiment to propel a rider-propelled vehicle, such as the bicycle 4 described above with reference to FIGS. 1-10, will be explained below. Alternate actuation by the rider of the levers in a downward direction about the first axis A effects angular displacement of the clutch housings 138 and the flange portions 141,143 in the first direction (counterclockwise when viewing the drive unit in FIG. 11 from the left end) about the second axis B. The clutch elements 140 transfer the angular displacement of the flange portion 143 to the first rotary shaft 120 in the first direction. A rotational drive force of the first rotary shaft 120 is transferred to the sleeve 144, rotating the latter and, therefore, the gear housing 142 in the first direction. A rotational drive force of the gear housing 142 is then transferred by the first and second set of pinions 148,150 to the internal gear 146 in the first direction in the same manner that the pinions 100,102 transfer a rotational drive force of the internal gear 92 to the internal gear 96 in the embodiment described above with reference to FIGS. 9-10. Rotation of the internal gear 146 drives the second rotary shaft 124 in the first direction (counterclockwise) to rotationally drive the chain sprocket 132.

A chain (not shown) passing over the chain sprocket 132 and the sprocket wheel of a rider-propelled vehicle, such as the bicycle 4 described above with respect to the embodiments of FIGS. 1-5, transmits the rotational drive of the chain sprocket in the first direction (counterclockwise) to drive the rear wheel 20 also in the first direction to propel the bicycle forwardly.

FIGS. 12-14 illustrate a seventh embodiment of the motion transfer mechanism 2 according to the present invention. FIG. 12 illustrates a bicycle 4 employing the motion transfer mechanism 2 according to the present embodiment. The bicycle 4 is provided with a frame substantially as described above with reference to the embodiment of FIGS. 1-5. However, in the present embodiment, a bar 160 extends from the seat tube 12 approximately at the level of the top tube 8 and defines, in essence, an extension of the top tube 8. However, it is understood by those of ordinary skilled in the art that the bar 160 could be at a higher or lower vertical level than the top tube 8 if desired.

The bar 160 extends over the rear wheel 20. A rearward end of the bar 160 is connected and braced on each side of rear wheel 20 to stays 14 by rear braces 162, the junction being created by rear stay ends 32 which are of conventional construction and in which the rear wheel 20 is journalled in a manner well known in the art.

Referring now to FIG. 13, the motion transfer mechanism 2 comprises a housing 163 which is affixed to the down tube 10, the seat tube 12 and the stays 14 of the frame of the bicycle 4 in the same manner described above with reference to the embodiment of FIGS. 1–5. A shaft 164 is rotatably supported for rotating motion about a first axis A, extending along a center axis of the shaft 164, within an axial bore 168 of the housing 163, such as through bearing elements (not shown), with left and right ends of the shaft 164 projecting from left and right ends of the housing 163, respectively. Left and right driving members or levers 169, 170 are mounted on the left and right ends, respectively, of the shaft 164 for alternate up-and-down movement about the first axis A. The ends of the shaft 164 are suitably threaded to secure the levers 169,170 by nuts 172. The levers 169,170 are suitably provided with treads 174,176, respectively, for secure engagement by the feet of the rider for reciprocal up-and-down movement of the levers as further described below.

The bar 160 carries a pair of opposed rotary members or discs 178,180 which are connected to each other by means of a rotary shaft 182 which is rotatably journalled in the bar 160 about a second axis B. The rear end of the lever 169 carries a connecting rod 184 which is pivotally connected to the lever 169 at one end and is rotatably connected to the disc 178 at the other end. Similarly, a connecting rod 186 is pivotally connected to the rear end of the lever 170 and is rotatably connected to the disc 180. The discs 178,180 are rigidly interconnected.

The disc 180 is provided with teeth 188 on its periphery. The teeth 188 mesh with the teeth of a smaller gear wheel 190 which is integrally united with, but spaced axially from, a gear wheel 192 of greater diameter than the gear wheel 190. A chain 194 (FIG. 12) engages the teeth of the gear wheel 192 as well as the teeth of a sprocket wheel 18 so that rotation of the gear wheel 192 causes rotation of the sprocket wheel and thus of the rear wheel 20 of the bicycle 4.

Propulsion of the bicycle 4 is effected by downward pressure of the rider's feet on the front ends of the levers 169, 170 about the first axis A. When the forward ends of the levers 169,170 are alternately depressed by the rider's feet, the connecting rods 184,186 will be alternately moved upwardly and will rotate the discs 178,180, respectively, about the second axis B. The connections of the connecting rods 184,186 to the discs 178,180, respectively, are offset by 180 degrees so that the connecting rods will uniformly rotate the discs as the levers 169,170 are alternately depressed.

As best shown in FIG. 14, when one of the levers 169, 170 is in the position of the line a—a, the upper end of the associated connecting rod is at position a; when a lever is in the position of the line b—b, the upper end of the associated connecting rod is at position b, etc. Preferably, the distance from the shaft 164 to the forward ends of the levers is at least three times the distance from the shaft 164 to the point of articulation of the connecting rods 184,186.

It will be appreciated that the levers 169,170 are linked by a lever return mechanism (not shown) in the manner described above with reference to the previous embodiments in order to facilitate alternate reciprocal motion of the levers 169,170 during use of the bicycle 4.

Figure 18:
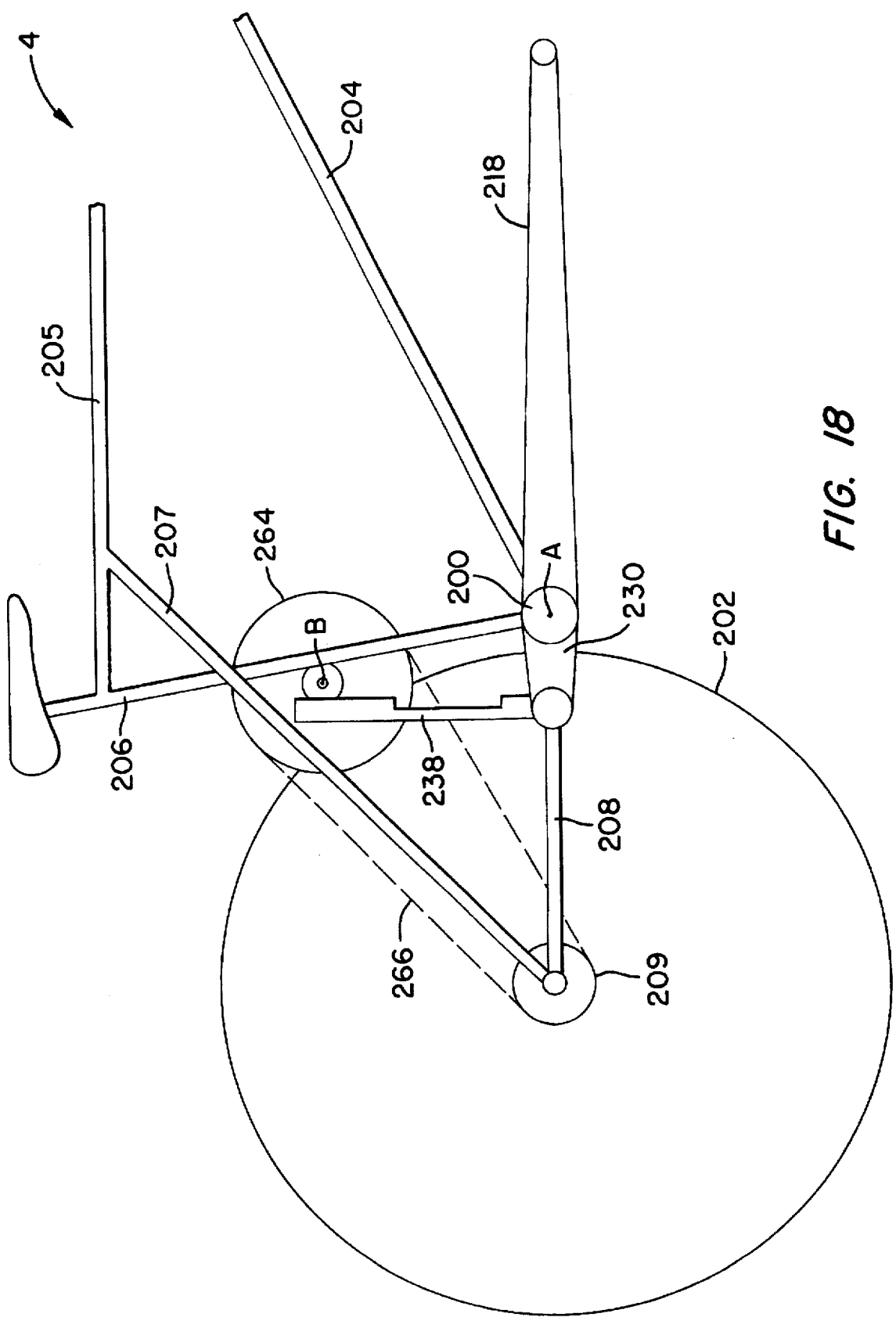
FIG. 18 is a partial diagrammatic side view of a rider-propelled vehicle employing the motion transfer mechanism shown in FIGS. 15–17.

FIGS. 15–18 show an eighth embodiment of the motion transfer mechanism 2 according to the present invention. FIG. 18 is a partial diagrammatic view of a bicycle 4 employing the motion transfer mechanism 2 according to the present embodiment.

Referring first to FIGS. 15 and 18, the motion transfer mechanism 2 comprises a stationary housing 200, shown partially cut open, which is affixed at the junction of a downtube 204, a seat tube 206 and rear stays 208 of the frame of the bicycle 4 in the same manner described above with reference to the embodiment of FIGS. 12–14. A shaft 210 is fixedly supported within an axial bore 214 of the stationary housing 200. The shaft 210 includes left and right ends projecting respectively out of left and right sides of the stationary housing 200. Right and left levers 216, 218 are mounted at rear end portions thereof to the left and right ends, respectively, of the shaft 210 through respective bearings 220,222 for alternate up-and-down movement about a first axis A defined by the center axis of the shaft 210. The ends of the shaft 210 are suitably threaded to secure the levers 216,218 by retaining nuts 224.

The levers 216,218 are suitably provided at forward end portions thereof with pedals 226,228, respectively, for secure engagement of the levers by the rider's feet. Rearward end portions of the levers 216,218 are provided with an extension 230 defining respective terminal ends of the levers. The levers 216,218 are interconnected at the terminal ends thereof with a drive unit, generally designated 232, which transfers the reciprocal up-and-down movement of the levers about the first axis A to rotary motion of a rear wheel 202 of the bicycle 4 in one direction of rotation (clockwise as viewed in FIG. 18) to propel the bicycle 4 forwardly. Details of the components of the drive unit according to the present embodiment will be described below with reference to FIGS. 15–17.

The drive unit comprises left and right toothed racks 238,236 pivotally connected at lower ends thereof to terminal ends of the levers 216,218, respectively. The lower end of each rack is provided with a pin 240 supported by a pivot rod 242 within a slot 244 formed at the terminal end of one of the levers 216,218 for relative pivotal movement thereof.

As best shown in FIGS. 16 and 17, the left and right toothed racks 238,236 drivingly interconnect the terminal ends of the left and right levers 218,216 to left and right unidirectional clutch assemblies 258,256, respectively, such that alternate up-and-down movement of the levers 216,218 about the first axis A in a first direction (clockwise as viewed in FIG. 16) effects rotary motion of an output shaft or rotary shaft 250 in the first direction about a second axis B extending along the center axis of the rotary shaft 250.

The rotary shaft 250 is mounted by bearings 252 within a stationary housing 254. As shown in FIG. 18, the stationary housing 254 is fixed to the frame of the bicycle 4 at a junction of the seat tube 206 and a pair of braces 207 connected at one end to a top tube 205 and at the other end to a sprocket wheel 209 on opposite sides of the rear wheel 202.

Left and right pinions 248,246 are disposed concentrically with the rotary shaft 250. The left and right pinions 248,246 are each provided with a toothed circumferential outer surface 245 for driving engagement with the left and right toothed racks 238,236, respectively, such that reciprocal up-and-down movement of the levers 216,218 effects angular displacement of the pinions 246,248 about the second axis B. The construction of each of the unidirectional clutch assemblies 256,258, including the arrangement of the clutch housings 268, friction blocks 269 and clutch elements 270, is the same as the unidirectional clutch assemblies 46,46 of the embodiment described above with reference to FIGS. 1–5. Similarly, the clutch housing 268 of each of the unidirectional clutch assemblies 256,258 is integrally connected to a respective one of the pinions 246,248 in the manner described above with respect to the embodiment of FIGS. 1–5. The left and right unidirectional clutch assemblies 258,256 and the left and right pinions 248,246 are independently supported on the rotary shaft 250 by ball bearings 262,260, respectively.

A chain sprocket 264 is connected to the rotary shaft 250, between the left pinion 248 and a left end of the stationary housing 254, for rotation therewith. As shown in FIG. 18, a sprocket chain 266 connects the chain sprocket 264 to a sprocket wheel 209 on the rear wheel 202 of the bicycle 4.

For each of the unidirectional clutch assemblies 256, 258, the clutch element 270 transmits angular displacement of the pinions 246,248, and thus the clutch housings 268, in the first (clockwise) direction to the friction blocks 269 to rotationally drive the rotary shaft 250 in only one direction of rotation, i.e., in the first clockwise direction, about the second axis B. On the other hand, angular displacement of the pinions, and therefore the clutch housings 268, in a second direction (counterclockwise as viewed in FIG. 16) causes the clutch element 270 to slip freely around the outer circumferential surface of the friction block 269 so that no drive force is transmitted to the friction block, and thus the rotary shaft 250 is not driven in the second direction.

In operation, when the forward ends of the levers 216, 218 are alternately depressed by the rider's feet to effect downward movement of the levers in the first direction (clockwise as viewed in FIG. 16) about the first axis A, the toothed racks 236,238 will be alternately moved upward to effect angular displacement of the pinions 246,248 and thus the clutch housings 268 in the first direction. The drive force of the pinions 246, 248 is transmitted by the clutch elements 270 and the friction blocks 269 to the rotary shaft 250, which is thereby rotationally driven in the first (clockwise) direction of rotation to rotationally drive the chain sprocket 264. As shown in FIG. 18, the chain 266 transmits the rotational motion of the chain sprocket 264 to the sprocket wheel 209 in the first direction to drive the rear wheel 202 in the first direction to propel the bicycle 4 forwardly.

During alternate movement of the levers 216, 218 in the upward direction about the first axis A, the toothed racks 236, 238 will be alternately moved downward effecting angular displacement of the pinions 246,248 in the second (counterclockwise) direction. The rotation of the pinions 246, 248 in the second direction causes the clutch elements 270 to freely slip around the outer circumferential surface of the friction blocks 269 so that no drive force is transmitted to the friction blocks, and thus the rotary shaft 250 is not rotated in the second direction.

Figure 19:
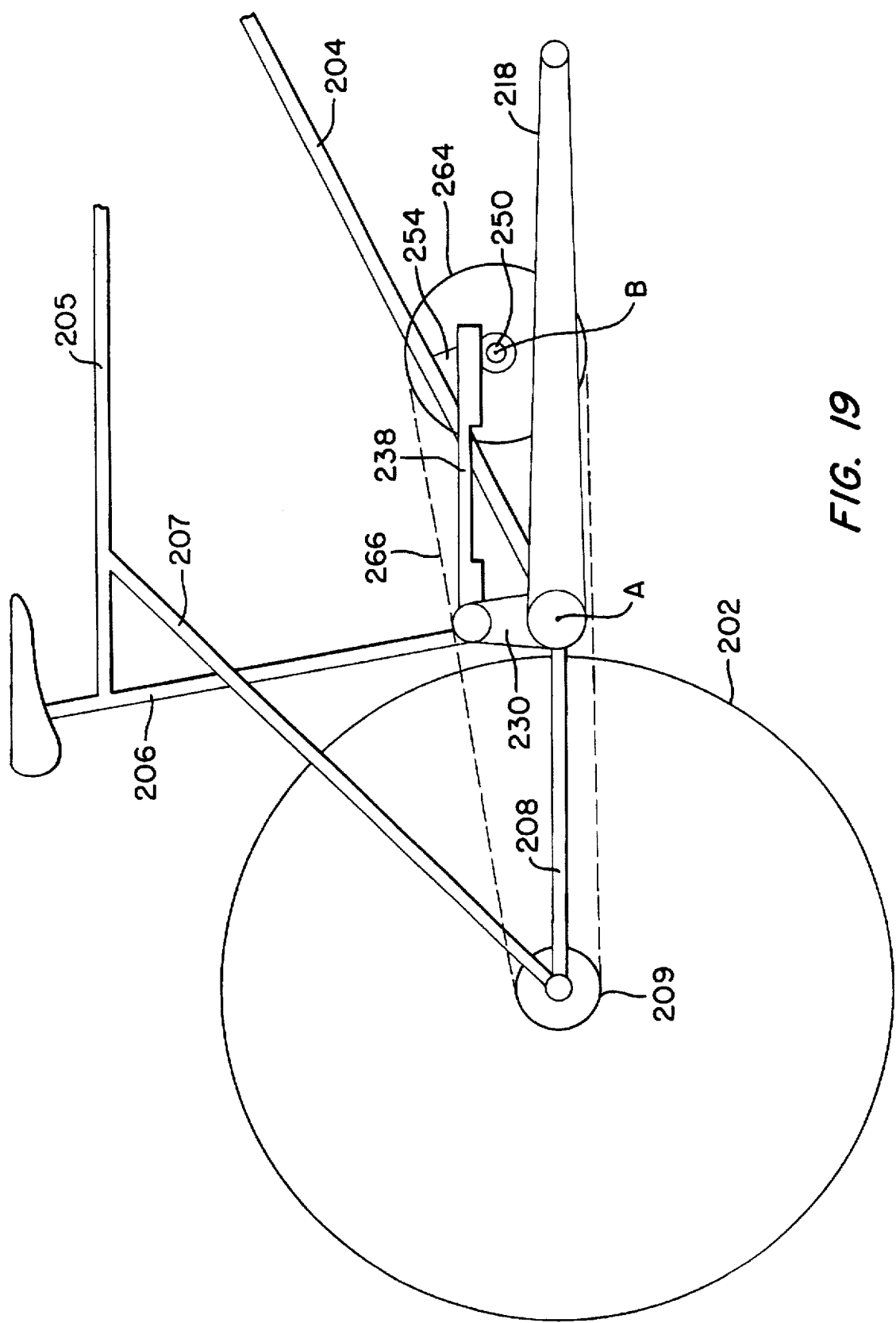
FIG. 19 is a partial diagrammatic side view of a rider-propelled vehicle employing a motion transfer mechanism according to a ninth embodiment of the present invention.

A ninth embodiment a motion transfer mechanism according to the present invention, as shown in FIG. 19, comprises the elements described above with reference to the embodiment of FIGS. 15–18. However, in the present embodiment, the stationary housing 254 is fixed to the down tube 204 of the bicycle frame. Furthermore, the first axis A is disposed rearwardly of and below the second axis B.

Actuation of the levers 216,218 in a downward direction about the first axis A by the rider moves the toothed racks 236,238 in the rightward direction, i.e., towards the front of the bicycle 4 shown in FIG. 19, effecting angular displacement of the pinions 246,248 in the first (clockwise) direction about the second axis B. Angular displacement of the pinions 246,248 effects corresponding angular displacement of the clutch housings 268 in the first direction, and the angular displacement of the clutch housings 268 is transmitted to the rotary shaft 250 by releasable engagement of the clutch elements 270 with the friction blocks 269 to thereby rotate the rotary shaft 250 in the first direction to rotationally drive the chain sprocket 264.

On the other hand, movement of the levers 216,218 in the upward direction causes the toothed racks 236,238 to move in leftward direction, i.e., toward the rear of the bicycle 4 shown in FIG. 19, effecting angular displacement of the the pinions 246,248, and thus the clutch housings 268, in the second (counterclockwise) direction. Angular displacement of the clutch housings 268 causes the clutch element 270 to freely slip around the circumferenline surface of the friction blocks 269 so that no drive force is transmitted to the friction blocks 269, and thus the rotary shaft 250 is not rotated in the second direction. Accordingly, only unidirectional rotation of the chain sprocket 264 is permitted by the foregoing construction of the motion transfer mechanism.

As described above with reference to the embodiment of FIG. 18, the chain sprocket 264 is adapted to receive a chain 266 for transmitting the rotational motion of the chain sprocket to the sprocket wheel 209 to rotationally drive the rear wheel 202 to propel the bicycle 4 forwardly.

Figure 20:
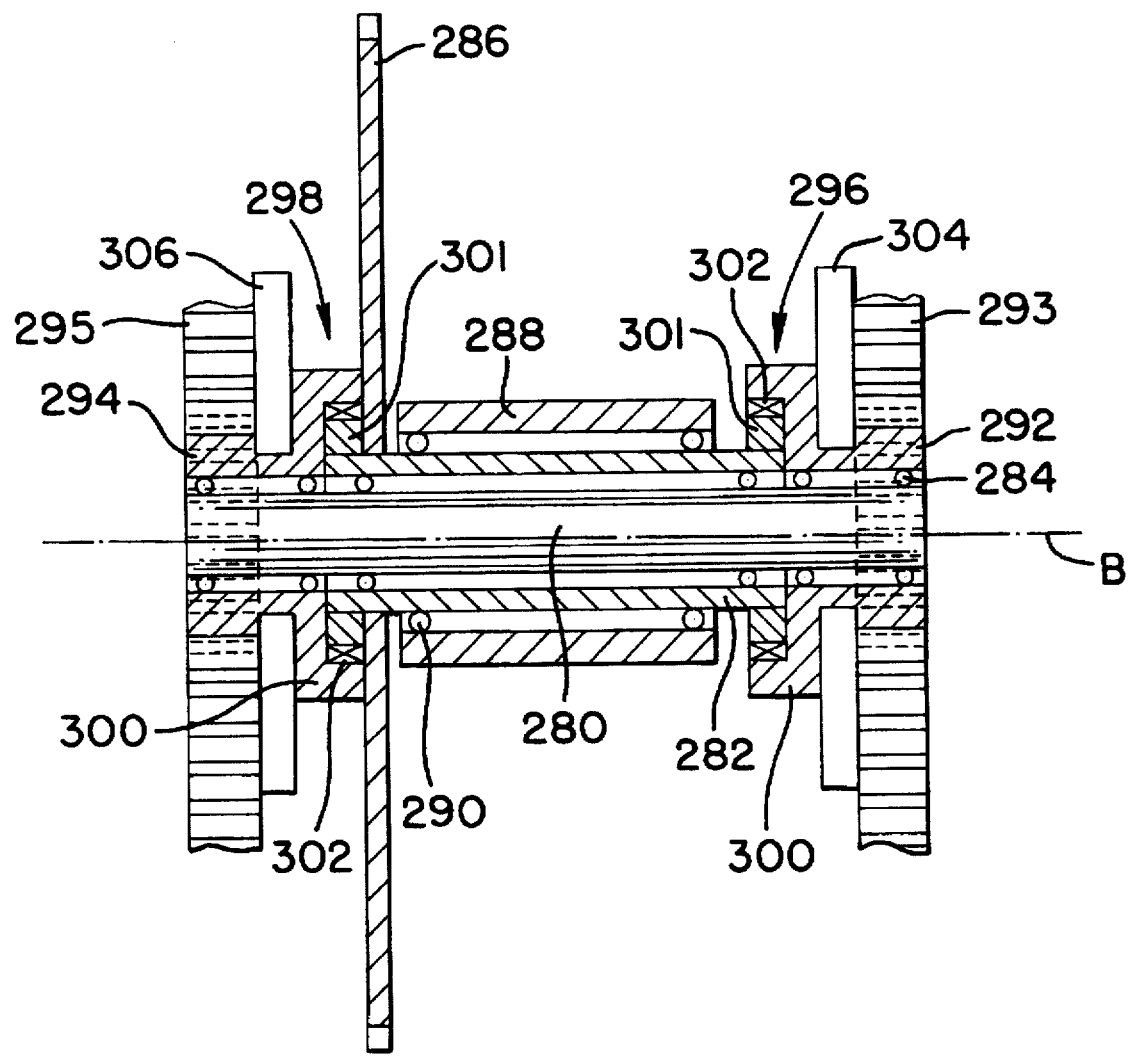
FIG. 20 is a partial cross-sectional view of a modified form of a drive unit for the motion transfer mechanism according to the eighth and ninth embodiments of the present invention.
Figure 21:
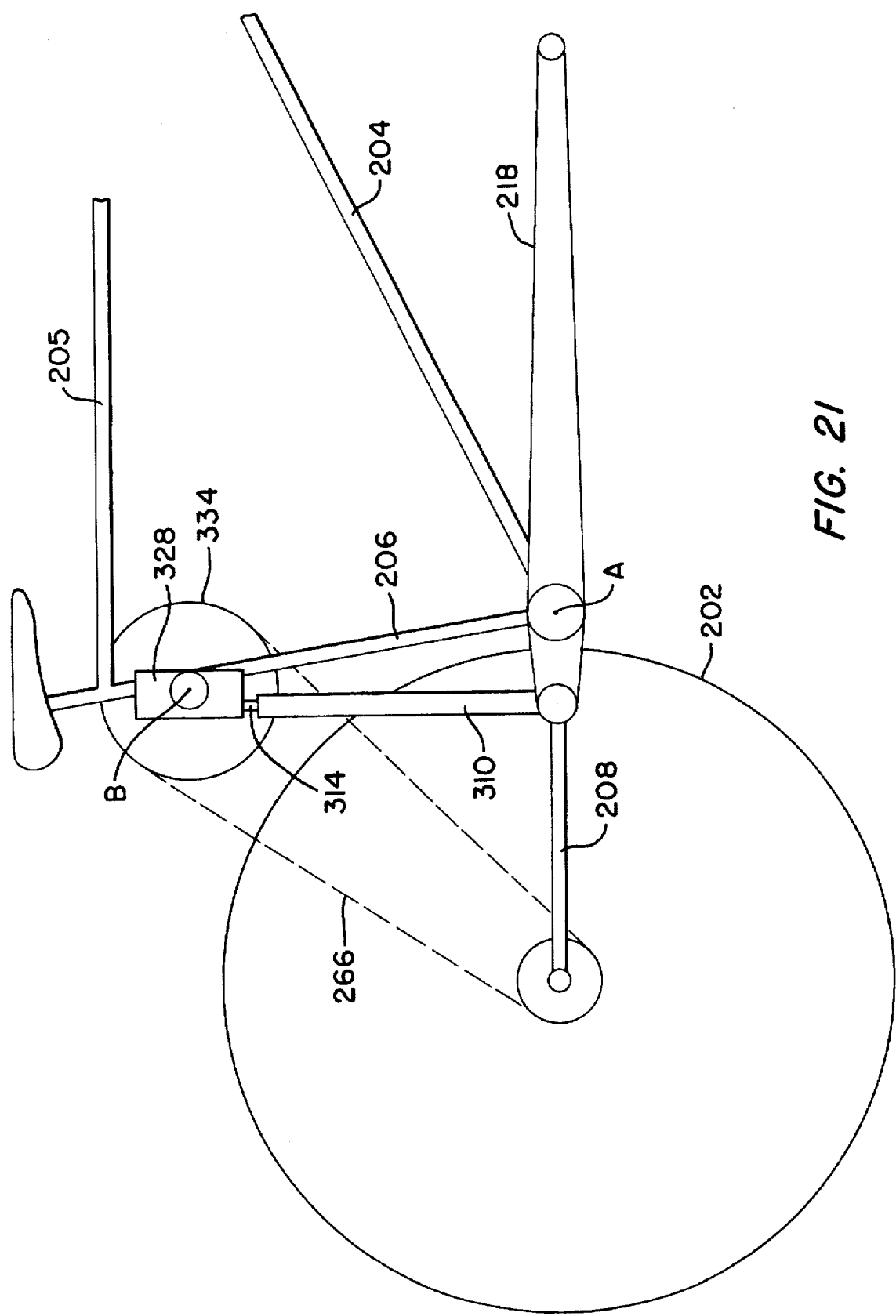
FIG. 21 is a partial diagrammatic side view of another modified form of a drive unit for the motion transfer mechanism according to the eighth and ninth embodiments of the present invention mounted to the frame of a rider propelled-vehicle.
Figure 22:
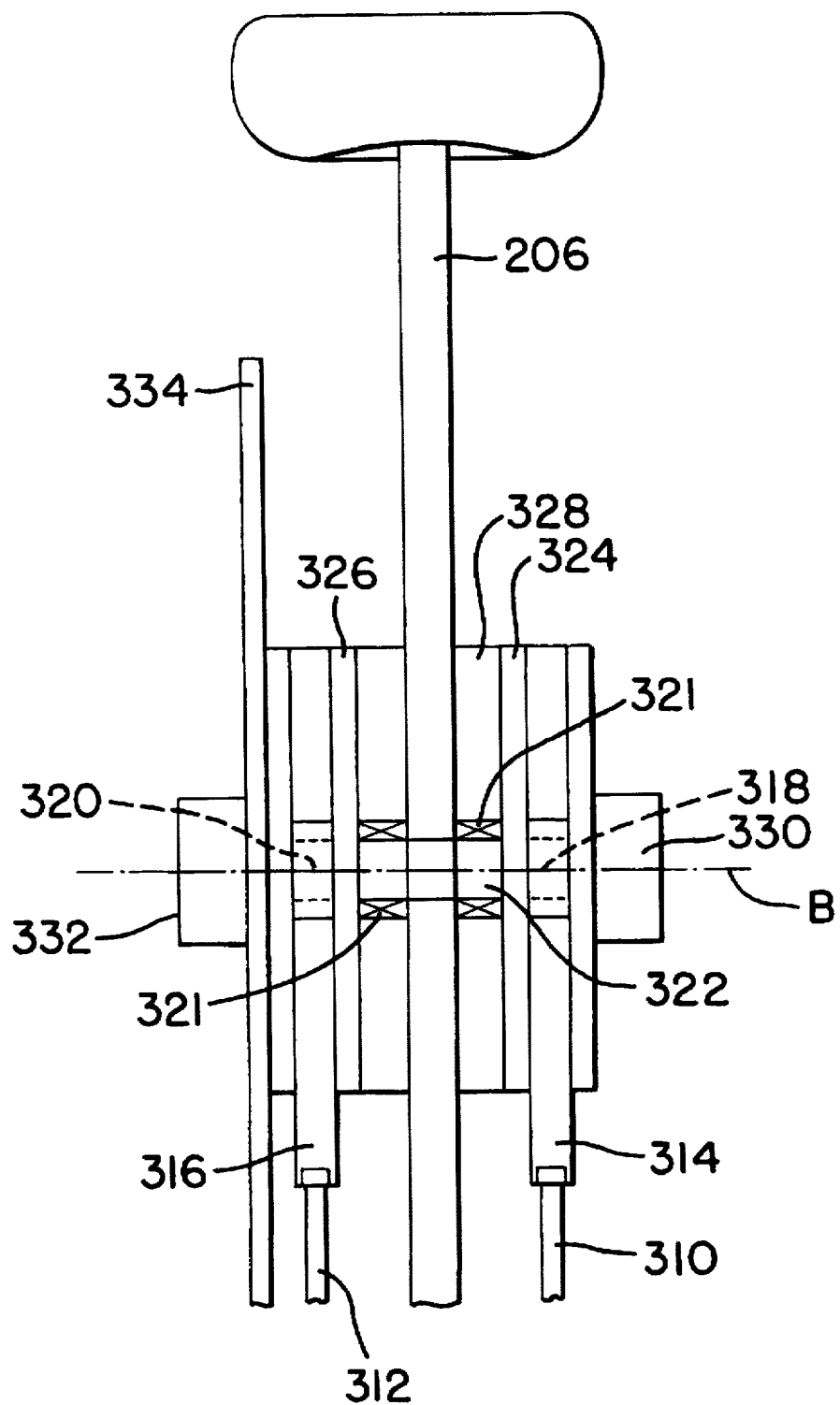
FIG. 22 is rear view of the drive unit shown in FIG. 21.

FIGS. 20 and 21–22 show two alternate embodiments for the drive unit of the motion transfer mechanisms described above with reference to the embodiments of FIGS. 15–18 and 19.

Referring first to FIG. 20, the driving unit comprises a stationary shaft 280 fixed to the frame of the bicycle through conventional connecting means. A hollow shaft 282 is mounted by bearings 284 coaxially with the stationary shaft 280 for rotation relative to the shaft 280. A chain sprocket 286 is connected to the hollow shaft 282 for rotation therewith. A stationary housing 288 is mounted by bearings 290 to the hollow shaft 282 and is fixed to the frame of the bicycle in the same manner described above with reference to the embodiment of FIGS. 15–18.

Left and right pinions 294,292 and corresponding left and right unidirectional clutch assemblies 298,296 are mounted by the bearings 284 coaxially with left and right ends, respectively, of the stationary shaft 280. Left and right toothed racks 295,293 are in driving engagement with the left and right pinions 294,292, respectively, in the same manner described above with reference to the embodiment of FIGS. 15–18.

Each of the unidirectional clutch assemblies 296,298 comprises the elements of the clutch assemblies described above with reference to the embodiment of FIGS. 15–18. However, in the present embodiment, a clutch housing 300 is mounted by the bearings 284 to the stationary shaft 280 for relative rotation thereof, and a friction block 301 is connected to the hollow shaft 282 for rotation therewith. A clutch element 302 is disposed between the clutch housing 300 and the friction block as in the previous embodiment described with reference to FIGS. 15–18. Rack guides 304,306 are disposed between the pinions 292,294, respectively, and the clutch housings 300 to guide the toothed racks 293,295 linearly during reciprocal up-and-down movement of the levers (not shown).

Reciprocal movement of the levers 216,218 in the downward direction about the first axis A by the rider move the toothed racks 293,295 in an upward direction effecting angular displacement of the pinions 292,294, and thus the clutch housings 300, in the first (clockwise) direction about the second axis B. The drive force of the pinions 292,294 is transferred by the unidirectional clutch assemblies 296,298 to the hollow shaft in the first direction 282 to rotationally drive the chain sprocket 286 in the manner described above with respect to the embodiment of FIGS. 15–18 and 19.

Upward movement of the levers 216,218 about the second axis B move the toothed racks 293,295 in a downward direction effecting angular displacement of the pinions 292, 294, and thus the clutch housings 300, in the second (counterclockwise) direction. The drive force of the pinions 292,294 in the second direction is isolated by each respective unidirectional clutch assembly 296,298, thereby permitting only unidirectional rotation of the rotary shaft 280 and the chain sprocket 286 in the first (clockwise) direction.

As described above with reference to the embodiment of FIG. 18, the chain sprocket 286 is adapted to receive a chain 266 for transmitting the rotational motion of the chain sprocket to the sprocket wheel 209 to rotationally drive the rear wheel 202 to propel the bicycle 4 forwardly.

Another embodiment of a drive unit according to the present invention, as shown in FIGS. 21–22, comprises the elements described above with reference to the embodiment of FIGS. 15–18. However, in the present embodiment, the rear ends of the levers 216,218 carry connecting rods 310,312, respectively, which are connected at upper ends thereof to the toothed racks 314,316, respectively. The lower ends of the connecting rods 310,312 are connected to terminal ends of a respective one of the levers in the manner, for example, described above with respect to the embodiment of FIGS. 12–14. The toothed racks 314,316 are disposed in driving engagement with pinions 318,320 mounted coaxially with and spaced from a rotary shaft 322 supported by bearings 321 within a stationary housing 328. As shown in FIG. 21, the stationary housing 328 is fixedly mounted to the seat tube 206 of the frame of the bicycle 4.

Referring to FIG. 22, rack guides 324,326 are fixedly connected to and disposed within the stationary housing 328 to guide the toothed racks 314,316 linearly during reciprocal up-and-down movement of the levers. Left and right unidirectional clutch assemblies 332,330 are mounted coaxially with left and right ends of the rotary shaft 322 extending out of the housing 322. The construction of the unidirectional clutch assemblies 330,332 and their connection to respective pinions 318,320 are the same as described above for the unidirectional clutch assemblies and pinions in the embodiment of FIGS. 15–17 and 19. A chain sprocket 334 is connected to the rotary shaft 322 for rotation therewith.

It will be appreciated that in the present embodiment the rotary shaft 322, the pinions 321,322, the rack guides 324,326 and a portion of the toothed racks 314,316 in driving engagement with the pinions 321,322 are all compactly enclosed within the stationary housing 328.

During operation, alternate downward movement of the levers 216,218 about the first axis A effects rotation of the rotary shaft 322 in the first (clockwise) direction to rotationally drive the chain sprocket 334 about the second axis B as described above for the rotary shaft 250 and chain sprocket 264 in the embodiment of FIGS. 15–18. On the other hand, downward movement of the levers 216,218 is isolated by each respective unidirectional clutch assembly 330,332, thereby permitting only unidirectional rotation of the rotary shaft 250 and the chain sprocket 334 in the first (clockwise) direction.

The materials for the components of the motion transfer mechanisms in the embodiments described with reference to FIGS. 9–22 are preferably the same as the materials described above with respect to the embodiments of FIGS. 1–8.

By the construction of the motion transfer mechanisms according to the foregoing embodiments, because the pivoting axis of the levers is at a point much closer to the rear ends of the levers than to their front ends, a relatively light force applied to the front ends of the levers will cause a substantially greater propelling force of the rider-propelled vehicle.

It will be understood that the dimensions of the frame of the bicycle 4 in the foregoing embodiments are selected so that the rider, seated upon the seat 30, can conveniently reach and apply a driving force to the forward ends of the levers. Because it is a feature of the present embodiments that the pivoting shaft be positioned forwardly of the rear wheel 20, the rear wheel will normally be further apart from the front wheel 24 than in conventional bicycles. However, the overall length of the bicycle 4 may be kept within the prescribed limits for bicycles, e.g. standards prescribed by racing organizations. For this purpose, it is desirable to position the stationary housing in the various embodiments as close to the forward end of the rear wheel 20 as possible.

It will be appreciated by those skilled in the art that each of the embodiments described above with reference to FIGS. 9–10, 11, 15–18, 19, 20 and 21–22 could be modified to incorporate a second chain sprocket in the same manner described above with reference to the embodiment of FIG. 7 without departing from the spirit and scope of the invention. It will also be appreciated that the embodiments of the drive units described above with reference to FIGS. 9–11 may be substituted for any of the drive units in the embodiments described above with reference to FIGS. 1–8.

From the foregoing, it will be appreciated by those skilled in the art that the unidirectional drive of the chain sprocket provides for the stepping drive of the rider-propelled vehicle in which the driving action is accomplished with a more efficient delivery of force as compared, for example, with the average force delivered in the case of a conventional bicycle.

Moreover, in the simplified construction of the motion transfer mechanism 2 according to the foregoing embodiments, the reciprocal back-and-forth motion of the levers is accomplished without substantially increasing the overall size and weight of the bicycle.

In addition to the foregoing features, it will be understood that the stroke of the levers is not confined to any specific value. Thus, a rider could use various short strokes or could use the full stroke of each lever. This advantage is in part a consequence of utilizing left and right unidirectional clutch assemblies for driving the chain sprocket which in turn drives, for example, the rear wheel of the bicycle.

From the foregoing description, it can be seen that the present invention comprises an improved motion transfer mechanism for transferring reciprocal motion to rotary motion. It will be appreciated by those skilled the art that obvious changes could be made to the embodiments described in the foregoing description without departing from the broad inventive concept thereof. For example, although the foregoing embodiments of the motion transfer mechanism have been described with a specific application to a bicycle, it will be appreciated that the foregoing embodiments are also particularly well adapted for other types of rider-propelled vehicles, such as, for example, small recreational cars, paddle boats and lightweight airplanes, as well as other applications, such as, for example, conventional exercise apparatus including stair climbers, stationary bicycles and other physical conditioning devices. Additionally, the foregoing embodiments may be assembled on the rider propelled vehicle in a manner which requires operation by alternate forward and backward movement of the levers instead of upward and downward movement. It is understood, therefore, that this invention is not limited to the particular embodiments disclosed, but is intended to cover all modifications thereof which are within the scope and spirit of the invention as defined by the appended claims.

What is claimed is:

1. A motion transfer mechanism for transferring reciprocal motion to rotary motion, the motion transfer mechanism comprising: driving means including at least one driving member for undergoing reciprocal motion about a first axis; rotary means including at least one rotary member for undergoing angular displacement about a second axis; means interconnecting the driving member to the rotary member, such that reciprocal motion of the driving member effects angular displacement of the rotary member about the second axis; a housing; driven means including at least one driven member rotatably supported within the housing for undergoing rotary motion in one direction of rotation about the second axis the rotary member being disposed concentrically over and spaced from an end of the driven member; and transfer means including at least one unidirectional clutch assembly disposed in the housing and extending from the rotary member along the second axis, the unidirectional clutch assembly drivingly connecting the rotary member to the driven member for transferring angular displacement of the rotary member to rotary motion of the driven member in said one direction of rotation; whereby reciprocal motion of the driving member about the first axis is transferred to rotary motion of the driven member in said one direction of rotation.

2. A motion transfer mechanism according to claim 1; wherein the at least one driving member comprises two levers each having front and rear end portions terminating, respectively, in front and rear ends and mounted to undergo reciprocal motion about the first axis; and the at least one rotary member comprises two rotary members each drivingly connected by the interconnecting means to one of the levers.

3. A motion transfer mechanism according to claim 2; wherein the front ends of the levers are further from the first axis than are the rear ends.

4. A motion transfer mechanism according to claim 2; wherein the interconnecting means comprises two toothed racks each connected to the rear end portion of one of the levers in driving engagement with one of the rotary members.

5. A motion transfer mechanism according to claim 4; wherein the interconnecting means further comprises a plurality of gear teeth disposed on an outer circumferential surface of each of the rotary members in meshing engagement with the toothed racks.

6. A motion transfer mechanism according to claim 1; wherein the first and second axes are disposed on a substantially horizontal plane.

7. A motion transfer mechanism according to claim 6; wherein the first axis is located rearwardly of the second axis.

8. A motion transfer mechanism according to claim 2; wherein the transfer means comprises two unidirectional clutch assemblies each drivingly connected to one of the rotary members.

9. A motion transfer mechanism for transferring reciprocal motion to rotary motion, the motion transfer mechanism comprising: at least one lever having front and rear end portions terminating, respectively, in front and rear ends and mounted to undergo reciprocal motion about a first axis located closer to the rear end than to the front end of the lever; at least one rotary member mounted to undergo reciprocal motion about a second axis; means interconnecting the lever to the rotary member, such that reciprocal motion of the lever effects reciprocal motion of the rotary member about the second axis; a housing; at least one driven member rotatably supported within the housing for undergoing rotary motion in one direction of rotation about the second axis, the rotary member being disposed concentrically over and spaced from an end of the driven member; and transfer means including at least one unidirectional clutch assembly disposed in the housing and extending from the rotary member along the second axis, the unidirectional clutch assembly drivingly connecting the rotary member to the driven member for transferring reciprocal motion of the rotary member to rotary motion of the driven member in said one direction of rotation; whereby reciprocal motion of the lever about the first axis is transferred to rotary motion of the driven member in said one direction of rotation.

10. A motion transfer mechanism according to claim 9; wherein the front end of the lever is further from the first axis than is the rear end.

11. A motion transfer mechanism according to claim 9; wherein the first and second axes are disposed on a substantially horizontal plane.

12. A motion transfer mechanism according to claim 11; wherein the first axis is located rearwardly of the second axis.

13. A motion transfer mechanism according to claim 9; wherein the driven member comprises a rotationally driven shaft; and the unidirectional clutch assembly is drivingly connected to the rotary member to transfer reciprocal motion of the rotary member to the shaft to rotationally drive the shaft in said one direction of rotation.

14. A motion transfer mechanism according to claim 9; wherein the unidirectional clutch assembly comprises a hollow cylindrical clutch housing connected to the rotary member for angular displacement therewith, a hollow cylindrical block member disposed within the clutch housing and connected to the driven member for rotation therewith; and a clutch element disposed between the clutch housing and the block member.

15. A motion transfer mechanism according to claim 14; wherein the driven member comprises a shaft disposed concentrically with the clutch housing and the block member of the unidirectional clutch assembly.

16. A motion transfer mechanism according to claim 15; wherein the rotary member is disposed concentrically with an end of the shaft.

17. A rider-propelled vehicle, comprising: a frame; rider actuated driving means mounted on the frame for undergoing reciprocal motion by the action of a rider about a first axis, the driving means comprising two levers each having front and rear end portions terminating, respectively, in front and rear ends and mounted to undergo reciprocal motion about the first axis; a housing integrally connected to the frame and disposed between the two levers; driven means including at least one driven member rotatably supported within the housing for undergoing rotary motion in one direction of rotation about a second axis; rotary means mounted on the frame for undergoing angular displacement about the second axis, the rotary means comprising two rotary members each drivingly connected by the interconnecting means to one of the levers; means interconnecting the driving means to the rotary means, such that reciprocal motion of the driving means effects angular displacement of the rotary means about the second axis; and transfer means including at least one unidirectional clutch assembly disposed in the housing and drivingly connecting the rotary means to the driven member for transferring angular displacement of the rotary means to rotary motion of the driven member in said one direction of rotation; whereby reciprocal motion of the driving means about; the first axis is transferred to rotary motion of the driven member in said one direction of rotation to propel the vehicle.

18. A rider-propelled vehicle according to claim 17; wherein the front ends of the levers are further from the first axis than are the rear ends.

19. A rider-propelled vehicle according to claim 17; wherein the first and second axes are disposed on a substantially horizontal plane.

20. A rider-propelled vehicle according to claim 19; wherein the first axis is located forwardly of the second axis.

21. A rider-propelled vehicle according to claim 17; wherein the driven means further comprises a rotationally driven sprocket wheel connected to the driven member for rotation therewith; and the unidirectional clutch assembly is drivingly connected to the rotary means to transfer angular displacement of the rotary means to the driven member and to the sprocket wheel to rotationally drive the sprocket wheel in said one direction of rotation.

22. A rider-propelled vehicle according to claim 17; wherein the transfer means comprises two unidirectional clutch assemblies each drivingly connected to one of the rotary members.

23. A motion transfer mechanism comprising: driving means including at least one driving member for undergoing reciprocal motion about a first axis; rotary means including at least one rotary member for undergoing angular displacement about a second axis; means interconnecting the driving member to the rotary member, such that reciprocal motion of the driving member effects angular displacement of the rotary member about the second axis; a housing; driven means including at least one driven member rotatably supported within the housing for undergoing rotary motion in one direction of rotation about the second axis; and transfer means including at least one unidirectional clutch assembly disposed in the housing and drivingly connecting the rotary member to the driven member for transferring angular displacement of the rotary member to rotary motion of the driven member in said one direction of rotation, the unidirectional clutch assembly comprising a hollow cylindrical clutch housing connected to the rotary member for angular displacement therewith, a hollow cylindrical block member disposed within the clutch housing and connected to the driven member for rotation therewith, and a clutch element disposed between the clutch housing and the block member; whereby reciprocal motion of the driving member about the first axis is transferred to rotary motion of the driven member in said one direction of rotation.

24. A motion transfer mechanism according to claim 23; wherein the driven member comprises a shaft disposed concentrically with the clutch housing and the block member of the unidirectional clutch assembly.

25. A motion transfer mechanism according to claim 24; wherein the rotary member is disposed concentrically with an end of the shaft.

26. A motion transfer mechanism according to claim 25; wherein the first and second axes are disposed on a substantially horizontal plane.

27. A motion transfer mechanism according to claim 25; wherein the first axis is located rearwardly of the second axis.

28. A motion transfer mechanism comprising: driving means comprising two levels each having front and rear end portions terminating, respectively, in front and rear ends and mounted to undergo reciprocal motion about a first axis; rotary means comprising two rotary members for undergoing angular displacement about a second axis; means for drivingly interconnecting each of the levers to one of the rotary members, such that reciprocal motion of the levers effects angular displacement of the rotary members about the second axis: a housing; driven means including at least one driven member rotatably supported within the housing for undergoing rotary motion in one direction of rotation about the second axis; and transfer means comprising two unidirectional clutch assemblies disposed in the housing and each drivingly connecting one of the rotary members to the driven member for transferring angular displacement of the rotary members to rotary motion of the driven member in said one direction of rotation, each unidirectional clutch assembly comprising a hollow cylindrical clutch housing connected to one of the rotary members for angular displacement therewith, a hollow cylindrical block member disposed within the clutch housing and connected to the driven member for rotation therewith, and a clutch element disposed between the clutch housing and the block member; whereby reciprocal motion of the levers about the first axis is transferred to rotary motion of the driven member in said one direction of rotation.

29. A motion transfer mechanism according to claim 28; wherein the driven member comprises a shaft having opposite ends and disposed concentrically with the clutch housing and the block member of each unidirectional clutch assembly.

30. A motion transfer mechanism according to claim 29; wherein each rotary member is disposed concentrically with one end of the shaft.

31. A rider-propelled vehicle comprising: a frame; rider actuated driving means mounted on the frame for undergoing reciprocal motion by the action of a rider about a first axis, the driving meads comprising two levers each having front and rear end portions terminating, respectively, in front and rear ends and mounted to undergo reciprocal motion about the first axis; a housing integrally connected to the frame; driven means including at least one driven member rotatably supported within the housing for undergoing rotary motion in one direction of rotation about a second axis; rotary means comprising two rotary members mounted on the frame for undergoing angular displacement about the second axis; means interconnecting each of the levers to one of the rotary members, such that reciprocal motion of the levers effects angular displacement of the rotary members about the second axis; and transfer means comprising two unidirectional clutch assemblies disposed in the housing and drivingly connecting the rotary members to the driven member for transferring angular displacement of the rotary members to rotary motion of the driven member in said one direction of rotation, each of the unidirectional clutch assemblies comprising a hollow cylindrical clutch housing connected to one of the rotary members for angular displacement therewith, a hollow cylindrical block member disposed within the clutch housing and connected to the driven member for rotation therewith, and a clutch element disposed between the clutch housing and the block member; whereby reciprocal motion of the driving member about the first axis is transferred to rotary motion of the driven member in said one direction of rotation to propel the vehicle.

32. A rider-propelled vehicle according to claim 31; wherein the driven means comprises a shaft having opposite ends and disposed concentrically with the clutch housing and the block member of each unidirectional clutch assembly.

33. A rider-propelled vehicle according to claim 32; wherein each rotary member is disposed concentrically with one end of the shaft.

34. A rider-propelled vehicle according to claim 33; wherein the driven means further comprises a first sprocket connected to one end of the shaft for rotation therewith.

35. A rider-propelled vehicle according to claim 34; wherein the vehicle, further comprises at least one seat supported by the frame for supporting a rider, at least one steerable wheel rotatably mounted to the frame for undergoing rotary motion about a third axis, a second sprocket connected to the wheel for rotation therewith, and chain means connected between the first and second sprockets for transferring rotation of the first sprocket to the wheel in said one direction of rotation to propel the vehicle.

36. A rider-propelled vehicle according to claim 35; wherein the first and second axes are located forwardly of the third axis.

37. A rider-propelled vehicle according to claim 36; wherein the first axis is located rearwardly of the second axis.

38. A motion transfer mechanism for transferring reciprocal motion to rotary motion, the motion transfer mechanism comprising: two levers each having front and rear end portions terminating, respectively, in front and rear ends and mounted to undergo reciprocal motion about a first axis; two rotary members mounted to undergo reciprocal motion about a second axis; two toothed racks each connected to the rear end portion of one of the levers in driving engagement with one of the rotary members, such that reciprocal motion of the levers effects angular displacement of the rotary members about the second axis; at least one driven member for undergoing rotary motion in one direction of rotation about the second axis; two unidirectional clutch assemblies each drivingly connected to one of the rotary members for transferring reciprocal motion of the rotary members to rotary motion of the driven member in said one direction of rotation, each of the unidirectional clutch assemblies comprising a hollow cylindrical clutch housing connected to one of the rotary members for reciprocal motion therewith, a hollow cylindrical block member disposed within the clutch housing and connected to the driven member for rotation therewith, and a clutch element disposed between the clutch housing and the block member; whereby reciprocal motion of the levers about the first axis is transferred by the unidirectional clutch assemblies to rotary motion of the driven member in said one direction of rotation.

39. A motion transfer mechanism for transferring reciprocal motion to rotary motion according to claim 38; wherein the driven member comprises a shaft having opposite ends and disposed concentrically with the clutch housing and the block member of each unidirectional clutch assembly.

40. A motion transfer mechanism for transferring reciprocal motion according to claim 39; wherein each rotary member is disposed concentrically with one end of the shaft.

41. A motion transfer mechanism for transferring reciprocal motion to rotary motion according to claim 38; wherein the first axis is located rearwardly of the second axis.

42. A motion transfer mechanism for transferring reciprocal motion to rotary motion according to claim 38; wherein the front ends of the levers are further from the first axis than are the rear ends.

43. A rider-propelled wheeled vehicle, comprising: a frame; at least one steerable front wheel rotatably mounted on the frame; at least one seat supported by the frame for seating a rider; two rider-actuated levers each having front and rear end portions terminating, respectively, in front and rear ends and pivotally mounted on the frame at opposite sides thereof to undergo reciprocal motion by the action of a rider about a first axis; two rotary members mounted on opposite sides of the frame to undergo angular displacement about a second axis, the first and second axes being disposed on a substantially horizontal plane; means interconnecting each lever at the rear end portions thereof to one of the rotary members, such that reciprocal motion of the levers effects angular displacement of the rotary members about the second axis; at least one rear wheel rotatably mounted on the frame to undergo rotation about a third axis; a housing disposed between the levers and integrally connected to the frame; and transmitting means including at least two unidirectional clutch assemblies disposed in the housing, each of the unidirectional clutch assemblies being drivingly connected to one of the rotary members for transmitting angular displacement of the rotary members to rotary motion of the rear wheel; whereby a rider can propel the vehicle by alternately depressing the front end portions of the levers to angularly displace the rotary members to thereby rotate the rear wheel.

44. A rider-propelled vehicle according to claim 43; wherein the first axis is located rearwardly of the second axis.

45. A rider-propelled vehicle according to claim 43; wherein the front ends of the levers are further from the first axis than are the rear ends.

46. A rider-propelled vehicle according to claim 45; wherein the first and second axes are located forwardly of the third axis.

47. A motion transfer mechanism comprising: driving means including at least one driving member for undergoing reciprocal motion about a first axis; rotary means including at least one rotary member for undergoing angular displacement about a second axis; means interconnecting the driving member to the rotary member, such that reciprocal motion of the driving member effects angular displacement of the rotary member about the second axis; a housing disposed between the two levers; driven means including at least one driven member rotatably supported within the housing for undergoing rotary motion in one direction of rotation about the second axis; and transfer means including at least one unidirectional clutch assembly disposed in the housing and drivingly connecting the rotary member to the driven member for transferring angular displacement of the rotary member to rotary motion of the driven member in said one direction of rotation; whereby reciprocal motion of the driving member about the first axis is transferred to rotary motion of the driven member in said one direction of rotation.

48. A motion transfer mechanism comprising: driving means comprising two levers each having front and rear end portions terminating, respectively, in front and rear ends and mounted to undergo reciprocal motion about a first axis; rotary means comprising two rotary members for undergoing angular displacement about a second axis; means for drivingly interconnecting each of the levers to one of the rotary members, such that reciprocal motion of the levers effects angular displacement of the rotary members about the second axis; a housing disposed between the two levers; driven means including at least one driven member rotatably supported within the housing for undergoing rotary motion in one direction of rotation about the second axis; and transfer means comprising two unidirectional clutch assemblies disposed in the housing and each drivingly connecting one of the rotary members to the driven member for transferring angular displacement of the rotary members to rotary motion of the driven member in said one direction of rotation; whereby reciprocal motion of the levers about the first axis is transferred to rotary motion of the driven member in said one direction of rotation.

49. A motion transfer mechanism comprising: a frame; rider actuated driving means the frame for undergoing reciprocal motion by the action of a rider about a first axis, the driving means comprising two levers each having front and rear end portions terminating, respectively, in front and rear ends and mounted to undergo reciprocal motion about the first axis; a housing integrally connected to the frame and disposed between the two levers; driven means including at least one driven member rotatably supported within the housing for undergoing rotary motion in one direction of rotation about a second axis; rotary means comprising two rotary members mounted on the frame for undergoing angular displacement about the second axis; means interconnecting each of the levers to one of the rotary members, such that reciprocal motion of the levers effects angular displacement of the rotary members about the second axis; and transfer means comprising two unidirectional clutch assemblies disposed in the housing and drivingly connecting the rotary members to the driven member for transferring angular displacement of the rotary members to rotary motion of the driven member in said one direction of rotation; whereby reciprocal motion of the driving member about the first axis is transferred to rotary motion of the driven member in maid one direction of rotation to propel the vehicle.

* * * * *